(12) United States Patent
Fajt et al.

(10) Patent No.: US 10,874,943 B2
(45) Date of Patent: Dec. 29, 2020

(54) SYSTEMS AND METHODS FOR TRANSFERRING OBJECT AUTHORITY IN A SHARED VIRTUAL ENVIRONMENT

(71) Applicant: Rec Room Inc., Seattle, WA (US)

(72) Inventors: Nicholas Fajt, Seattle, WA (US);
Cameron Brown, Seattle, WA (US);
Dan Kroymann, Seattle, WA (US);
Omer Bilal Orhan, Seattle, WA (US);
Johnathan Bevis, Seattle, WA (US);
Joshua Wehrly, Seattle, WA (US)

(73) Assignee: Rec Room Inc., Seattle, WA (US)

( * ) Notice: Subject to any disclaimer, the term of this patent is extended or adjusted under 35 U.S.C. 154(b) by 0 days.

(21) Appl. No.: 16/312,925

(22) PCT Filed: Jun. 28, 2017

(86) PCT No.: PCT/US2017/039799
§ 371 (c)(1),
(2) Date: Dec. 21, 2018

(87) PCT Pub. No.: WO2018/005671
PCT Pub. Date: Jan. 4, 2018

(65) Prior Publication Data
US 2019/0329129 A1 Oct. 31, 2019

Related U.S. Application Data

(60) Provisional application No. 62/355,658, filed on Jun. 28, 2016.

(51) Int. Cl.
*G06F 15/173* (2006.01)
*H04L 12/24* (2006.01)
(Continued)

(52) U.S. Cl.
CPC ............ *A63F 13/358* (2014.09); *A63F 13/57* (2014.09); *A63F 2300/534* (2013.01);
(Continued)

(58) Field of Classification Search
CPC ........ A63F 13/12; A63F 13/428; A63F 13/56; A63F 13/57; A63F 2300/534;
(Continued)

(56) References Cited

U.S. PATENT DOCUMENTS 6,409,599 B1 * 6/2002 Sprout .................... A63F 13/08
463/31
7,803,054 B1 9/2010 Ogus et al.
(Continued)

OTHER PUBLICATIONS

International Search Report and Written Opinion dated Sep. 28, 2017, issued in corresponding International Application No. PCT/US2017/039799, filed Jun. 28, 2017, 10 pages.
(Continued)

*Primary Examiner* — Lawrence S Galka
(74) *Attorney, Agent, or Firm* — Christensen O'Connor Johnson Kindness PLLC

(57) ABSTRACT

In some embodiments of the present disclosure, endpoint systems participating in a shared virtual environment simulate objects locally that a user of the endpoint system is likely to interact with. In some embodiments, object authority is thus managed by the endpoint systems, and is not managed by a central server. In some embodiments, a subsequent endpoint system likely to interact with an object may be predicted, and object authority may be transferred to the subsequent endpoint system before the interaction in order to provide an immersive experience for a user of the subsequent endpoint system. In some embodiments, efficient techniques for transmitting notifications between endpoint systems are provided.

18 Claims, 20 Drawing Sheets

(51) Int. Cl.
*A63F 13/358* (2014.01)
*A63F 13/57* (2014.01)

(52) U.S. Cl.
CPC ... *A63F 2300/5533* (2013.01); *A63F 2300/64* (2013.01); *A63F 2300/8082* (2013.01)

(58) Field of Classification Search
CPC .......... A63F 2300/5533; A63F 2300/64; A63F 2300/8082; G06F 3/011; G06T 19/006
See application file for complete search history.

(56) References Cited

U.S. PATENT DOCUMENTS

| | | | |
|---|---|---|---|
| 8,126,994 B2 | 2/2012 | Richards | |
| 8,678,929 B1 | 3/2014 | Nishimura et al. | |
| 8,751,204 B2 | 6/2014 | Falash et al. | |
| 8,805,773 B2 | 8/2014 | Fiedler | |
| 8,823,701 B2 | 9/2014 | Aldridge et al. | |
| 8,898,325 B2 | 11/2014 | Lee et al. | |
| 9,056,252 B2 | 6/2015 | Shah | |
| 9,483,157 B2 | 11/2016 | Leacock et al. | |
| 9,600,306 B2 | 3/2017 | Hamilton, II et al. | |
| 10,230,583 B1* | 3/2019 | Cheng | H04L 67/38 |
| 2003/0177187 A1* | 9/2003 | Levine | A63F 13/10 709/205 |
| 2005/0238005 A1 | 10/2005 | Chen et al. | |
| 2007/0094325 A1 | 4/2007 | Ih et al. | |
| 2008/0102955 A1 | 5/2008 | D'Amora et al. | |
| 2008/0133652 A1* | 6/2008 | Richards | A63F 13/12 709/203 |
| 2009/0099824 A1* | 4/2009 | Falash | G09B 9/00 703/8 |
| 2011/0126131 A1* | 5/2011 | Baszucki | G06F 3/011 715/757 |
| 2011/0238835 A1 | 9/2011 | Tanimoto | |
| 2011/0298824 A1 | 12/2011 | Lee et al. | |
| 2013/0120364 A1* | 5/2013 | Aldridge | A63F 13/77 345/419 |
| 2014/0228115 A1* | 8/2014 | Kaplan | G06F 30/15 463/31 |
| 2017/0104661 A1 | 4/2017 | Anastasi et al. | |
| 2017/0124225 A1 | 5/2017 | Humphrey et al. | |

OTHER PUBLICATIONS

Schuwerk, C., et al., "An Area-of-Interest Based Communication Architecture for Shared Haptic Virtual Environments," Proceedings of the 2013 IEEE International Symposium on Haptic Audio Visual Environments and Games (HAVE), Oct. 26-27, 2013, Istanbul, 6 pages.

Unity3d, "How do I properly handle Client Authority with Interactable Objects?" message board, Sep. 18, 2016, <http://unity3d.com/>, 3 pages.

Unity3d, "Unity Multiplayer: Transfer Client Authority?" message board, Sep. 30, 2015, <http://unity3d.com/>, 3 pages.

\* cited by examiner

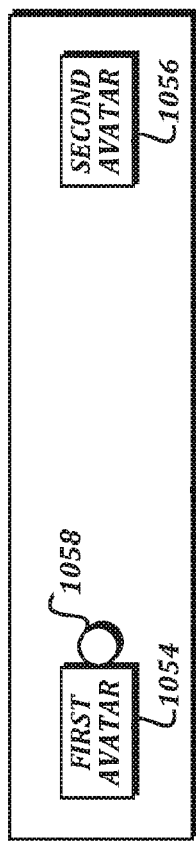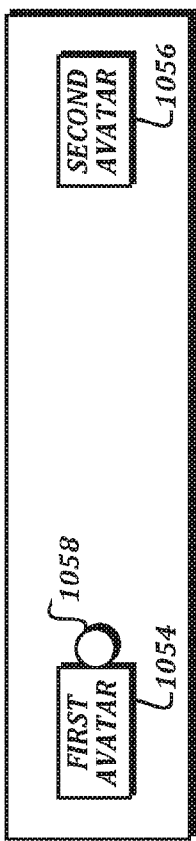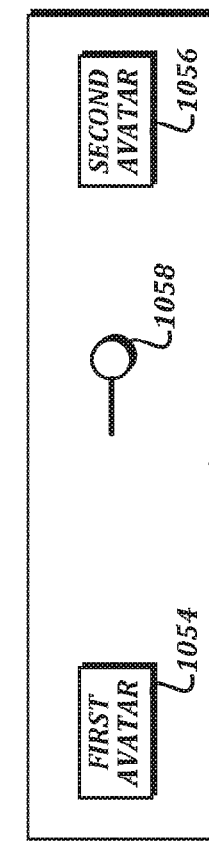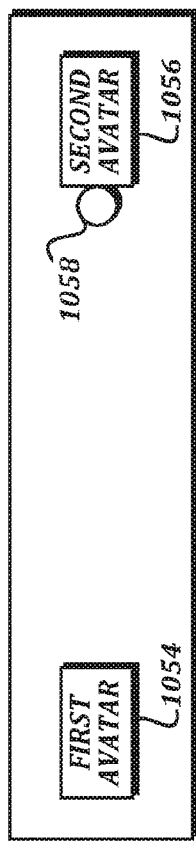

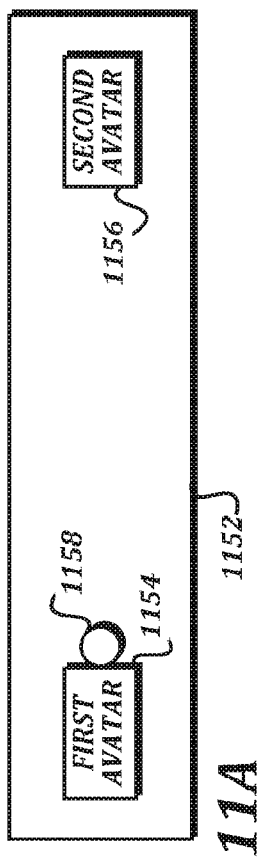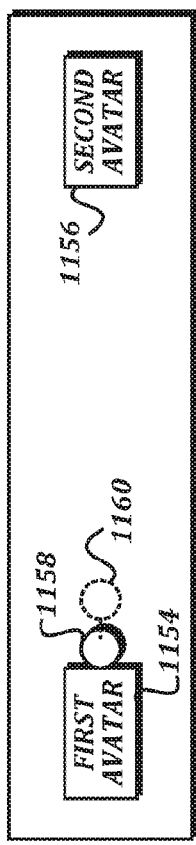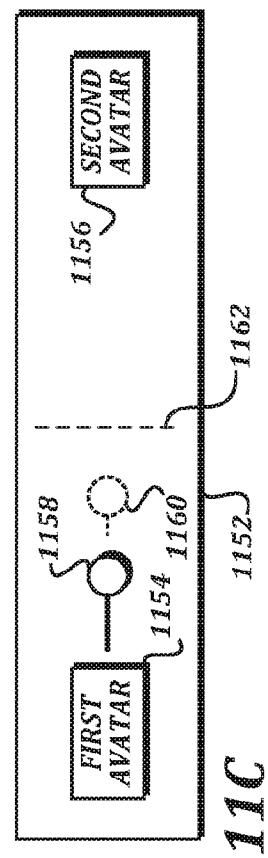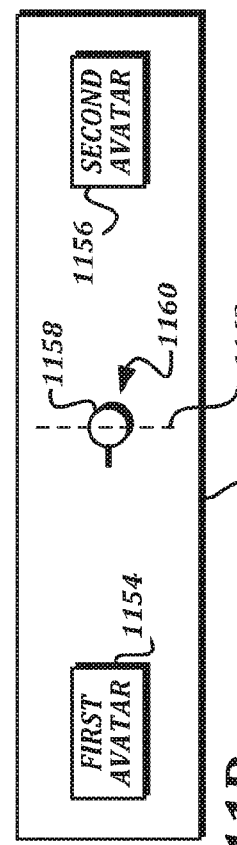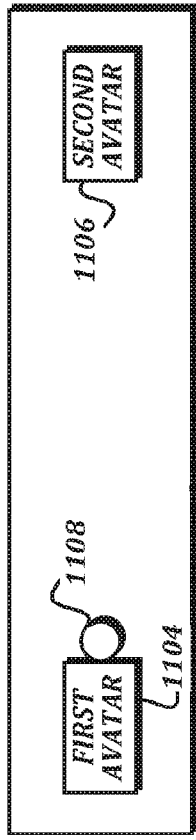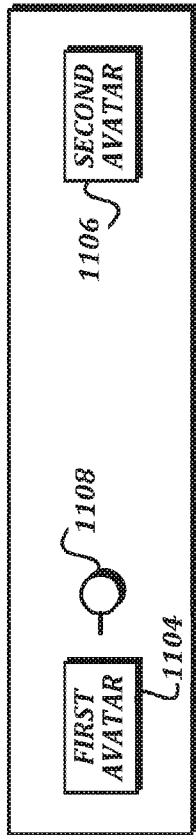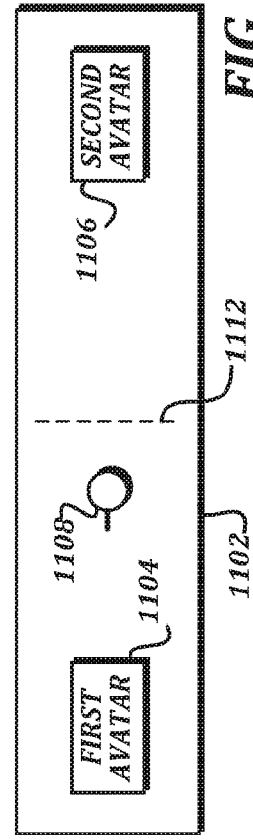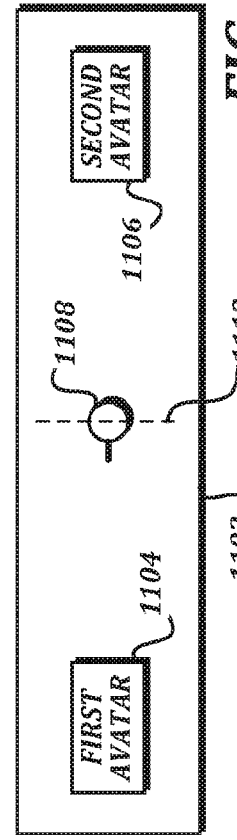
FIG. 11A  FIG. 11B  FIG. 11C  FIG. 11D

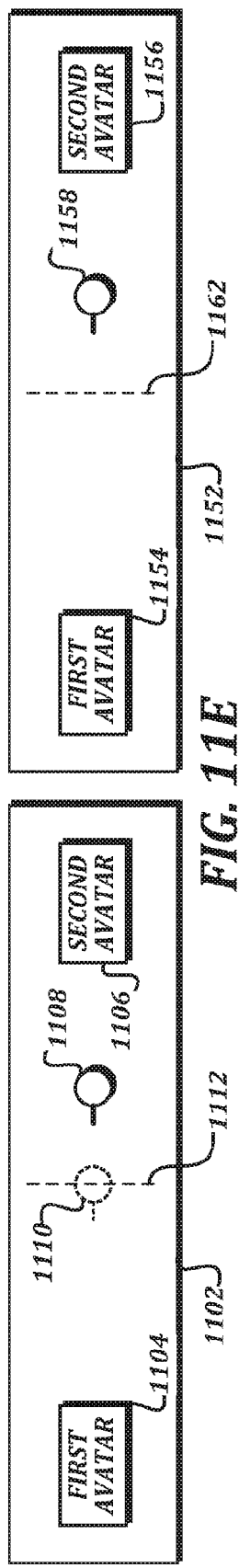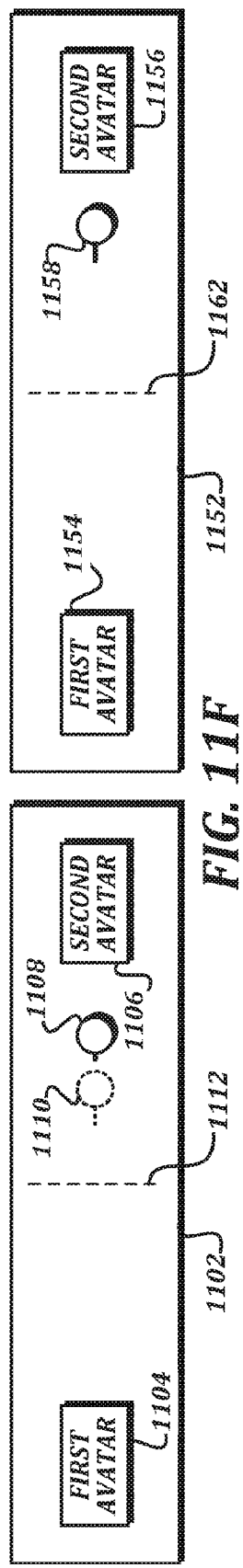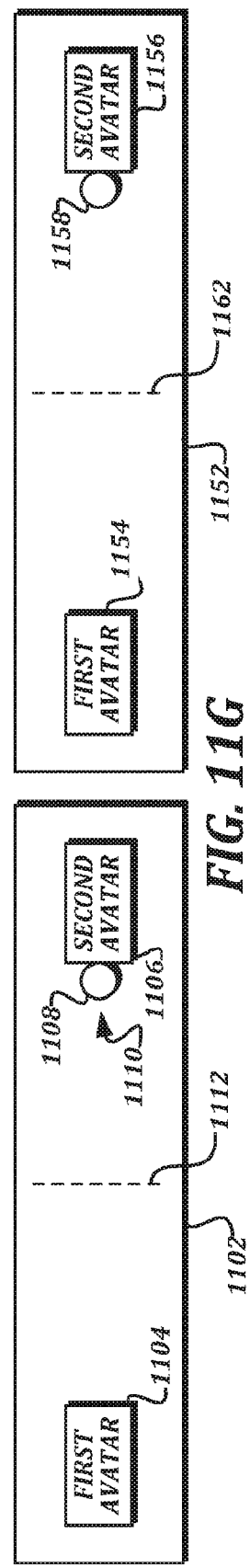

SYSTEMS AND METHODS FOR TRANSFERRING OBJECT AUTHORITY IN A SHARED VIRTUAL ENVIRONMENT

CROSS-REFERENCES TO RELATED APPLICATIONS

The present application claims the benefit of Provisional Application No. 62/355,658, filed Jun. 28, 2016, the entire disclosure of which is hereby incorporated by reference herein for all purposes.

The present application is related to International Patent application Ser. No. PCT/US2017/039800, filed Jun. 28, 2017, entitled SYSTEMS AND METHODS FOR MANAGING PERMISSION FOR INTERACTING WITH VIRTUAL OBJECTS BASED ON VIRTUAL PROXIMITY; International Patent application Ser. No. PCT/US2017/039801, filed Jun. 28, 2017, entitled SYSTEMS AND METHODS PROVIDING TEMPORARY DECOUPLING OF USER AVATAR SYNCHRONICITY FOR PRESENCE ENHANCING EXPERIENCES; International Patent application Ser. No. PCT/US2017/039824, filed Jun. 28, 2017, entitled SYSTEMS AND METHODS FOR ASSISTING VIRTUAL GESTURES BASED ON VIEWING FRUSTUM; and International Patent application Ser. No. PCT/US2017/039826, filed Jun. 28, 2017, entitled SYSTEMS AND METHODS FOR DETECTING COLLABORATIVE VIRTUAL GESTURES, the entire disclosures of which are hereby incorporated by reference herein for all purposes.

BACKGROUND

Virtual environments such as virtual reality environments, augmented reality environments, and the like, are growing in popularity. For such environments to be successful, it is important for the presentation of the environment to be as immersive as possible. Difficulties in providing immersiveness can arise in these systems, however, particularly when multiple users are participating in the same virtual environment to create a shared virtual environment. What is desired are systems and techniques that can improve immersiveness in shared virtual environments.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for managing object authority within a shared virtual environment is provided. The system comprises a first endpoint system and a second endpoint system. The first endpoint system is configured to simulate motion of an object within the shared virtual environment, wherein the first endpoint system initially has object authority over the object; and transmit at least one location change notification based on the simulated motion. The second endpoint system is configured to receive the at least one location change notification; predict future movement of the object based on the at least one location change notification; and, in response to determining that the object is predicted to interact with an avatar associated with the second endpoint system, transmit an authority transfer notification to other endpoint systems to assign object authority for the object to the second endpoint system.

In some embodiments, a method for managing object authority within a shared virtual environment is provided. A first endpoint system simulates motion of an object within the shared virtual environment, wherein the first endpoint system initially has object authority over the object. The first endpoint system transmits location change notifications for the object based on the simulated motion. The first endpoint system receives an authority transfer notification generated by a second endpoint system indicating that the second endpoint system has taken object authority over the object. The first endpoint system ceases to transmit location change notifications for the object. An endpoint system comprising an endpoint computing device, a head-mounted display device communicatively coupled to the endpoint computing device, and at least one handheld controller device communicatively coupled to the endpoint computing device is also provided, wherein the endpoint system is configured to perform this method.

In some embodiments, a method for managing object authority within a shared virtual environment is provided. A second endpoint system receives at least one location change notification from a first endpoint system. The second endpoint system predicts future movement of the object based on the at least one location change notification. In response to determining, by the second endpoint system, that the object is predicted to interact with an avatar associated with the second endpoint system, the second endpoint system transmits an authority transfer notification to other endpoint systems to assign object authority for the object to the second endpoint system. An endpoint system comprising an endpoint computing device, a head-mounted display device communicatively coupled to the endpoint computing device, and at least one handheld controller device communicatively coupled to the endpoint computing device is also provided, wherein the endpoint system is configured to perform this method.

In some embodiments, a method of distributing notifications for a shared virtual environment is provided. A communication relay server receives a notification from a first endpoint system, wherein the notification relates to interactions within the shared virtual environment. The communication relay server determines a plurality of other endpoint systems affected by the interaction within the shared virtual environment. The communication relay server transmits the notification to the plurality of other endpoint systems.

In some embodiments, computing devices configured to perform any one of the above-described methods are provided. In some embodiments, a non-transitory computer-readable medium is provided. The non-transitory computer-readable medium has computer-executable instructions stored thereon that, in response to execution by one or more processors of a computing device, cause the computing device to perform any one of the above-described methods.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 10A-10D are schematic illustrations that illustrate how artifacts due to latency may arise if object authority is transferred in a naïve manner in a game of catch between avatars;

FIGS. 11A-11G are schematic illustrations that illustrate an example technique for avoiding synchronization discontinuities according to various aspects of the present disclosure.

DETAILED DESCRIPTION

Figure 1:
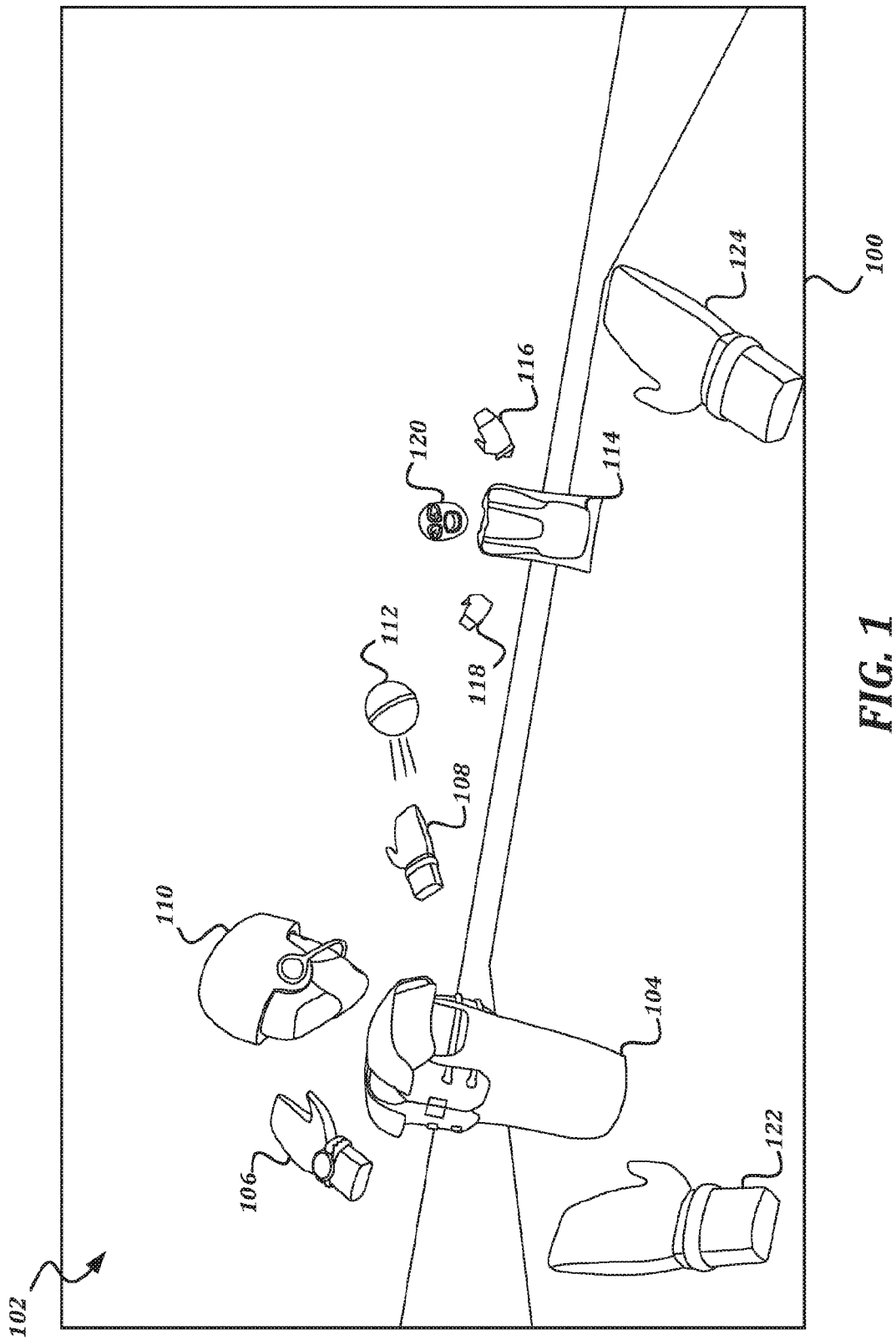
FIG. 1 is an illustration of an example embodiment of a shared virtual environment according to various aspects of the present disclosure.

FIG. 1 is an illustration of an example embodiment of a shared virtual environment according to various aspects of the present disclosure. In FIG. 1, a display 100 of a head-mounted display device is illustrated, showing a view of a shared virtual environment 102 presented to a user via the head-mounted display device. The shared virtual environment 102 is a virtual room in which two or more users may interact with each other and/or with objects within the shared virtual environment through avatars. As shown, the view is a first-person view of the shared virtual environment 102, and two avatars can be seen. A first avatar has a head 110, a torso 104, a left hand 106 and a right hand 108. A second avatar also has a head 120, a left hand 116, a right hand 118, and a torso 114. In the illustrated scene, the first avatar has just thrown a ball 112 towards the second avatar. Because the scene is a first-person view, the user can also see a left hand 122 and a right hand 124 that correspond to the user's own avatar. This scene is an illustrative example to establish context for the rest of the disclosure, and should not be seen as limiting to any specific type of avatar, object, or virtual room.

Figure 2:
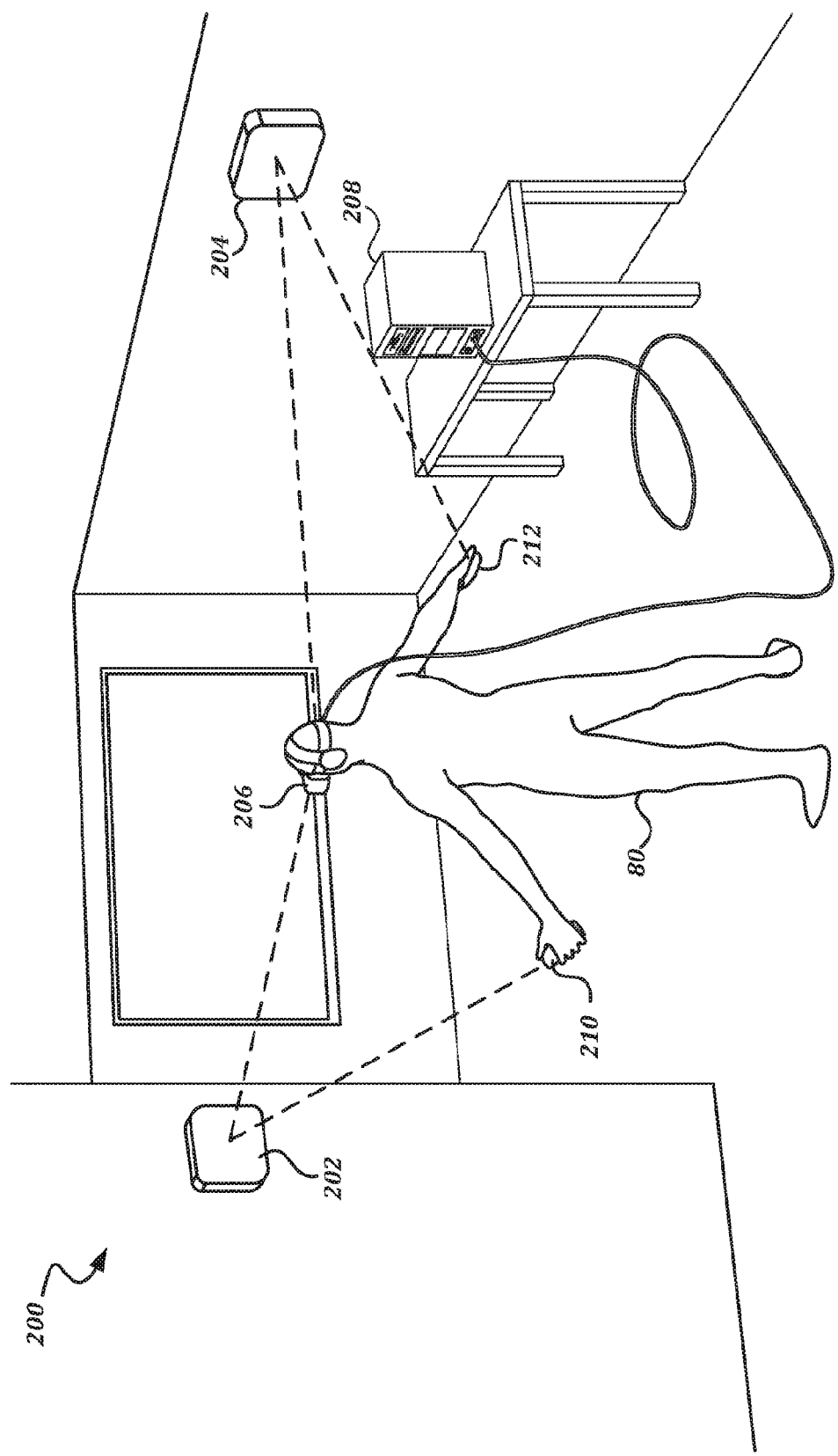
FIG. 2 is an illustration of a user interacting with an example embodiment of an endpoint system according to various aspects of the present disclosure.

Each avatar in the shared virtual environment is associated with an endpoint system. FIG. 2 is an illustration of a user interacting with an example embodiment of an endpoint system according to various aspects of the present disclosure. The user 80 is in a room 200 that has been configured with an endpoint system. An endpoint computing device 208 is connected to a head-mounted display device 206 worn by the user 80 via a cable. The user 80 holds a first handheld controller device 210 in one hand, and a second handheld controller device 212 in the other hand. One or more motion sensor devices 202, 204 are arranged around the room 200, and detect the position and/or motion of the head-mounted display device 206 and the handheld controller devices 210, 212 within the room 200. The endpoint computing device 208 may use the detected positions and/or motions of the handheld controller devices 210, 212 to control the hands of the avatar 122, 124 within the shared virtual environment 102. The endpoint computing device 208 may use the detected positions and/or motions of the head-mounted display device 206 to move the avatar associated with the endpoint system within the shared virtual environment 102, and to move the viewpoint rendered by the head-mounted display device 206 within the shared virtual environment 102. Further details regarding each of these components are provided below.

In order to provide the most immersive experience for users of the shared virtual environment, it is desirable to have the shared virtual environment mimic the real world as much as possible. For instance, it is desirable to make objects within the shared virtual environment move and behave as if they are governed by the rules of Newtonian physics. While physics simulations of virtual objects are common, the use of such simulations in a shared virtual environment is less common. In order to generate a traditional shared virtual environment, a central device would typically be used to simulate each of the virtual objects, and would transmit the state of the objects to endpoint systems for presentation. However, the latency involved in such transmissions can be disorienting and can diminish the immersiveness of the presentation. To improve the experience, embodiments of the present disclosure simulate objects within the shared virtual environment at the endpoint systems so that there is no latency. For a given object, the endpoint system that is interacting with the object is assigned object authority over that object, and generates the physical simulation of the object. That endpoint system then transmits notifications to other endpoint systems to share the state of the object.

Figure 3A:
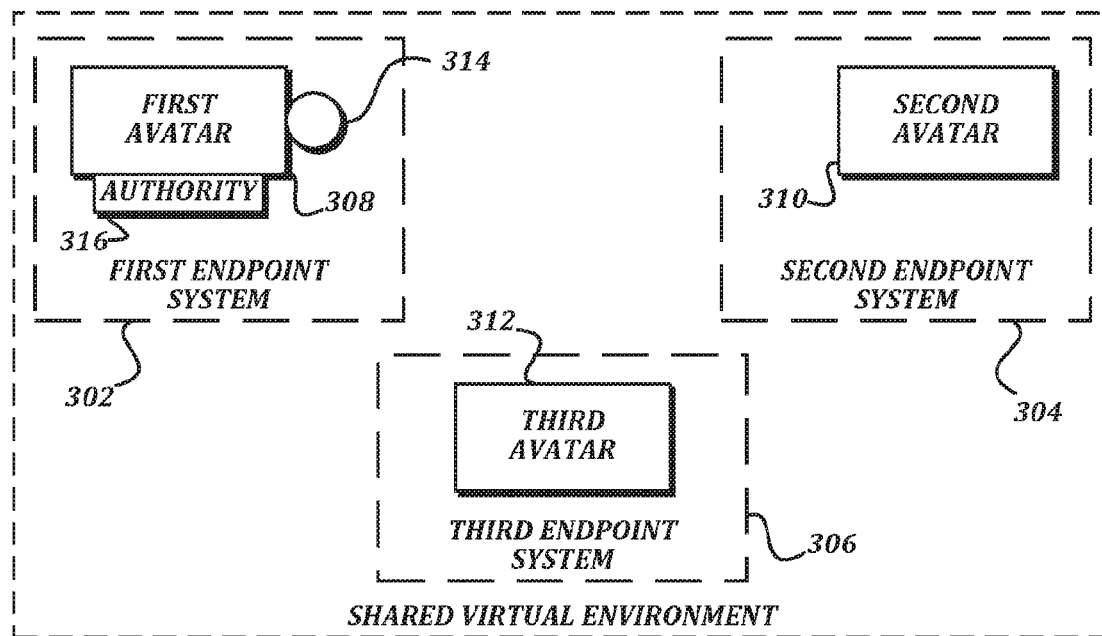
FIGS. 3A-3B are schematic illustrations that show the transfer of object authority for an object within the shared virtual environment from a first endpoint system to a second endpoint system according to various aspects of the present disclosure.
Figure 3B:
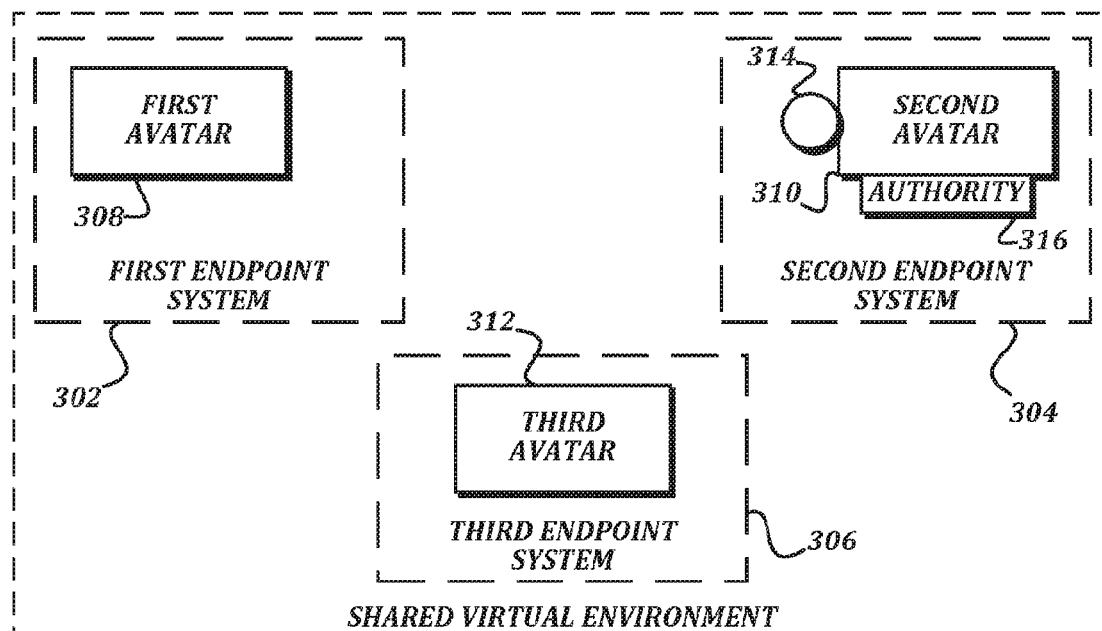

Because the virtual environment is shared, objects can be transferred from one avatar to another. This means, for objects that can be transferred from one avatar to another (like a thrown ball, etc.), object authority will need to be transferred from a first endpoint system to a second endpoint system. Further, endpoint systems will need to be able to present objects for which they do not have object authority. FIGS. 3A-3B are schematic illustrations that show the transfer of object authority for an object within the shared virtual environment from a first endpoint system to a second endpoint system according to various aspects of the present disclosure. As illustrated, a first endpoint system 302, a second endpoint system 304, and a third endpoint system 306 are participating in the shared virtual environment 300. The first endpoint system 302 is associated with a first avatar 308, the second endpoint system 310 is associated with a second avatar 310, and the third endpoint system 306 is associated with a third avatar 312. The shared virtual environment may include many shared objects, but a single shared object, a ball 314, is illustrated.

In FIG. 3A, the first avatar 308 is interacting with the ball 314. Accordingly, the first endpoint system is assigned object authority 316 for the ball 314. In some embodiments, when a given endpoint system has object authority for an object, the location of the object within the shared virtual environment that is reported by the given endpoint system is used by other endpoint systems to place the object within the shared virtual environment as presented by the other endpoint systems. As an example, if a first endpoint system reports that an object for which it has object authority is at an X-coordinate of 17, a Y-coordinate of 15, and a Z-coordinate of 3 in a three-dimensional coordinate system of the shared virtual environment, each of the other endpoint systems will present the object at these X, Y, and Z coordinates. In some embodiments, a location may also include an orientation, such as a quarternion or an orthogonal rotation (e.g., pitch, roll, and yaw values) indicating a direction with respect to the coordinate system of the shared virtual environment Later, the first avatar 314 may stop interacting with the ball 314, and the second avatar 310 may start interacting with the ball 314. This situation is illustrated in FIG. 3B. Because the second avatar 310 is now interacting with the ball 314, object authority 316 has been passed from the first endpoint system 302 to the second endpoint system 304. This allows the second endpoint system 304 to simulate the behavior of the ball 314 using techniques that will not suffer from network latency for the user of the second endpoint system 304, thus providing an immersive experience.

While this transfer of object authority from the first endpoint system 302 to the second endpoint system 304 appears simple, complications arise in certain scenarios, as will be discussed in detail below.

Figure 4:
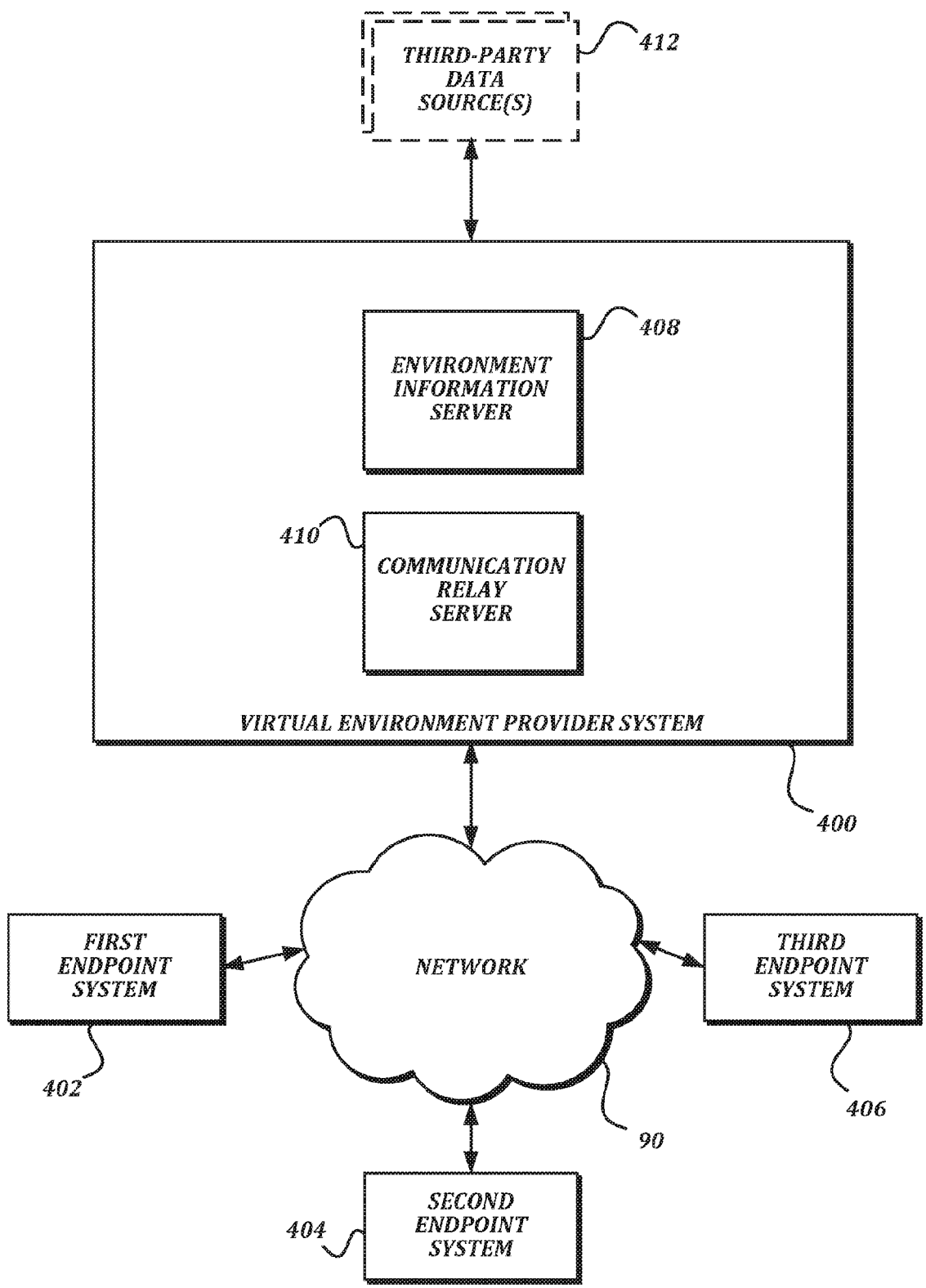
FIG. 4 is a block diagram that illustrates an example embodiment of a virtual environment provider system according to various aspects of the present disclosure.

FIG. 4 is a block diagram that illustrates an example embodiment of a virtual environment provider system according to various aspects of the present disclosure. In the illustrated embodiment, the virtual environment provider system 400 includes an environment information server 408 and a communication relay server 410.

In some embodiments, the environment information server 408 is primarily responsible for managing persistent information relating to providing the shared virtual environment. For example, the environment information server 408 may manage user account information, preferences, long-lived virtual object information, and/or other information. In some embodiments, the communication relay server 410 is primarily responsible for distributing notifications received from endpoint systems to other endpoint systems. The communication relay server 410 may also extract some data for temporary storage from the notifications that pass through it. Further description of the functionality provided by the environment information server 408 and the communication relay server 410 is provided below.

Each server of the virtual environment provider system 400 may be one or more computing devices. In some embodiments, the environment information server 408 and the communication relay server 410 may be merged to be provided by a single computing device. In some embodiments, the virtual environment provider system 400 may include a plurality of computing devices that interchangeably provide the functionality of both servers 408, 410. In some embodiments, the servers 408, 410 of the virtual environment provider system may be provided using a cloud computing service. In some embodiments, the virtual environment provider system 400 may be co-located with (or may be provided by) the same computing devices as one of the endpoint systems 402-406. In some embodiments, the virtual environment provider system 400 is remote from the endpoint systems 402-406.

In the illustrated embodiment, the virtual environment provider system 400 communicates with a plurality of endpoint systems, including a first endpoint system 402, a second endpoint system 404, and a third endpoint system 406 via a network 90. In some embodiments, there may be more or fewer than three endpoint systems communicating with each other and the virtual environment provider system 400, though three are illustrated herein in order to describe the functionality of the system. Connections via the network 90 may be implemented using any combination of suitable wired and/or wireless communication technology, including but not limited to Ethernet, fiber-optics, WiFi, 2G, 3G, LTE, WiMAX, and Bluetooth.

In the illustrated embodiment, the virtual environment provider system 400 may optionally communicate with one or more third-party data sources 412. Third-party data sources 412 may be run by different parties than the virtual environment provider system 400, and may be used to provide enhanced content within the virtual environment provider system 400. Some examples of third-party data sources 412 include, but are not limited to, social networking services, billing services, providers of third-party content such as virtual objects, and media providing services.

Figure 5A:
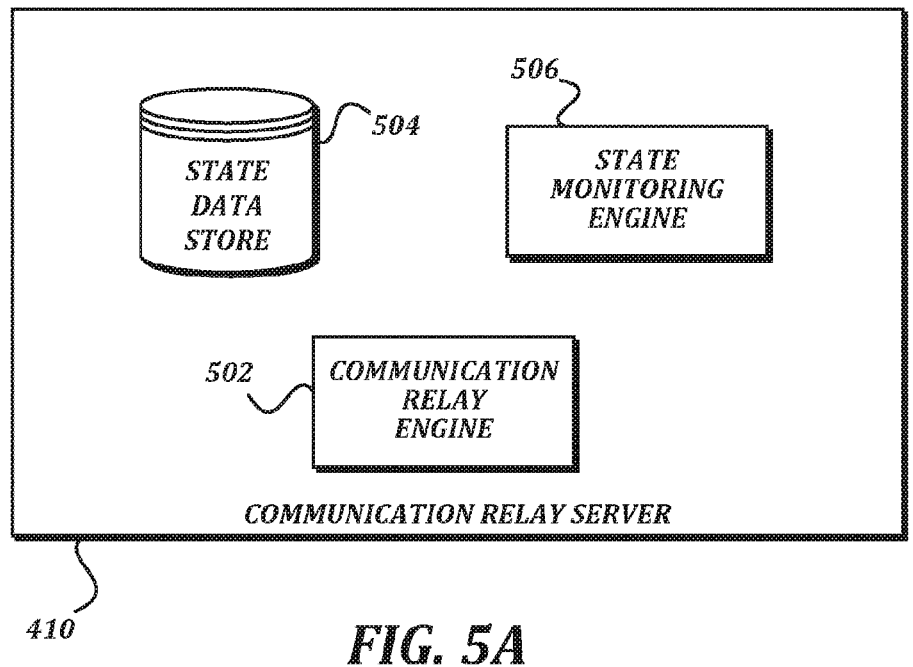
FIG. 5A is a block diagram that illustrates an example embodiment of a communication relay server according to various aspects of the present disclosure.

FIG. 5A is a block diagram that illustrates an example embodiment of a communication relay server according to various aspects of the present disclosure. Typically, bandwidth available to endpoint systems may be asymmetric. That is, a bandwidth available for upload may be significantly less than a bandwidth available for download. While this may not present a significant problem when a first endpoint system 402 and a second endpoint system 404 are the only endpoint systems, the problem arises as additional endpoint systems are added. If notifications were transmitted directly between endpoint systems (instead of via the communication relay server 410), a transmitting endpoint system would have to send an additional notification for each new endpoint system taking part in the shared virtual environment. Hence, as the number of objects for which notifications are transmitted from a first endpoint system 402 and the number of other endpoints both increase, the number of notifications that have to be transmitted by the first endpoint system 402 increases exponentially. This is likely to rapidly consume the available upload bandwidth. To solve this problem, the first endpoint system 402 can send a single notification to the communication relay server 410, and the communication relay server 410 sends it to the other endpoint systems. This helps conserve the limited upload bandwidth available to the first endpoint system 402. Further details of how this transmission may take place are provided below in FIG. 9 and the accompanying text.

In the illustrated embodiment, the communication relay server 410 includes a state monitoring engine 506, a communication relay engine 502, and a state data store 504.

In general, the word "engine," as used herein, refers to logic embodied in hardware and/or software instructions, which can be written in a programming language, such as C, C++, C#, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub-engines. The engines can be stored in any type of computer-readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the endpoint computing device 602. One example of a data store is a highly reliable, high-speed RDBMS or key-value store executing on one or more computing devices and accessible over a high-speed packet switched network. Such data stores may be likely to be used by the virtual environment provider system 400. One of ordinary skill in the art will recognize that separate data stores described herein may be combined into a single data store, and/or a single data store described herein may be separated into multiple data stores, without departing from the scope of the present disclosure.

In some embodiments, the communication relay engine 502 is configured to receive notifications from endpoint systems, and to re-transmit those notifications to other endpoint systems. In some embodiments, the state monitoring engine 506 is configured to manage state information held within the state data store 504. In some embodiments, the state monitoring engine 506 may review the notifications received by the communication relay engine 502, and may store information from the notifications in the state data store 504. In some embodiments, the state monitoring engine 506 may ignore information that is ephemeral (including but not limited to location information from location change notifications associated with moving objects), because it will change too quickly to be usefully stored. In some embodiments, the state monitoring engine 506 may wait to store location information in the state data store 504 until the location change notifications indicate that a previously moving object has come to rest. In some embodiments, the state monitoring engine 506 may store information from notifications that is not ephemeral (or at least that changes on a less-frequent basis), such as whether an avatar is present in the shared virtual environment, a score for a game being played, and/or the like. Though each endpoint system should be receiving the notifications from the communication relay engine 502, storing data in the state data store 504 allows an endpoint system that joins the shared virtual environment later to receive initial status upon joining, instead of having to wait to receive notifications from the various endpoint systems to know what objects to present.

Figure 5B:
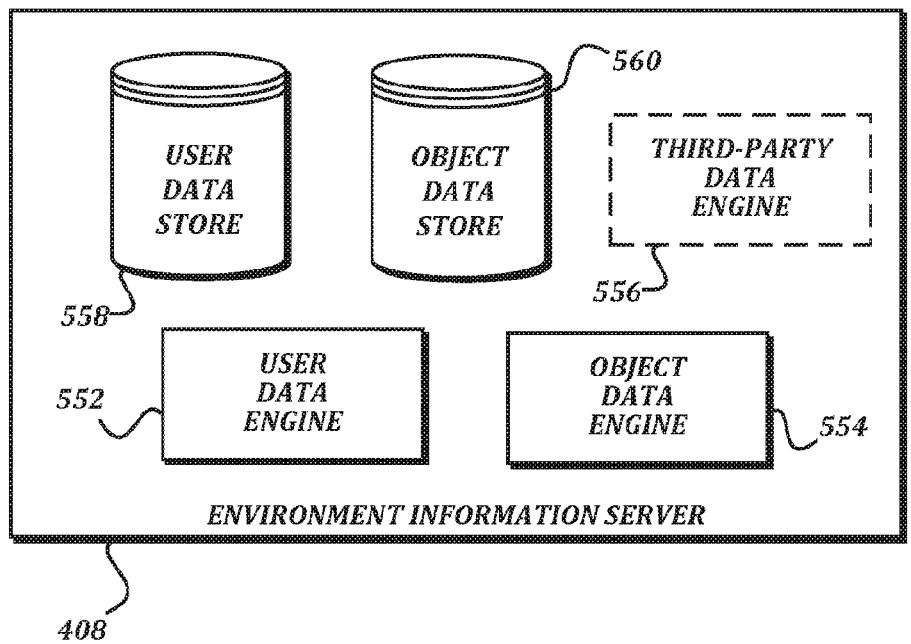
FIG. 5B is a block diagram that illustrates an example embodiment of an environment information server according to various aspects of the present disclosure.

FIG. 5B is a block diagram that illustrates an example embodiment of an environment information server according to various aspects of the present disclosure. In some embodiments, presenting the shared virtual environment will involve shared, immutable objects that can be altered by the environment provider but are otherwise static (such as walls, game logic, and/or the like). Presenting the shared virtual environment may also involve managing user settings, permissions, objects, and the like. While endpoint systems may be suitable for simulating the shared virtual environment for presentation, the intermittent connectivity of endpoint systems makes them unsuitable for managing this type of information. Accordingly, the environment information server 408 may manage and distribute such information.

In the illustrated embodiment, the environment information system 408 includes a user data engine 552, an object data engine 554, an optional third-party data engine 556, a user data store 558, and an object data store 560.

In some embodiments, the user data engine 552 is configured to manage user data within the user data store 558. Some non-limiting examples of user data include unique user identifiers, login and password information, contact information, avatar customization information, preferences, and billing information. The user data may be manipulated through interfaces in the shared virtual environment itself, or through an additional user interface (such as a web-based interface) provided by the environment information server 408.

In some embodiments, the object data engine 554 is configured to manage object data within the object data store 560. The object data may include, but is not limited to, a unique identifier of the object (or an object type); a model representing shape, mass, texture, density, and other physical attributes of the object (or object type); a default location for the object; an owner of the object; and one or more scripts defining behavior of the object.

In some embodiments, the third-party data engine 556 is configured to interact with one or more third-party data sources 412. As some non-limiting examples, the third-party data engine 556 may exchange information with a social network service to allow users within the shared virtual environment to communicate via the social network, to retrieve or upload media or other social postings, and/or for federated authentication. In some embodiments, the third-party data engine 556 may connect with a billing service in order to charge users for access to features within the shared virtual environment. In some embodiments, the third-party data engine 556 may communicate with a third-party content provider to determine whether a given user has access to particular content within the shared virtual environment, or to retrieve such content as requested by the user.

Figure 6:
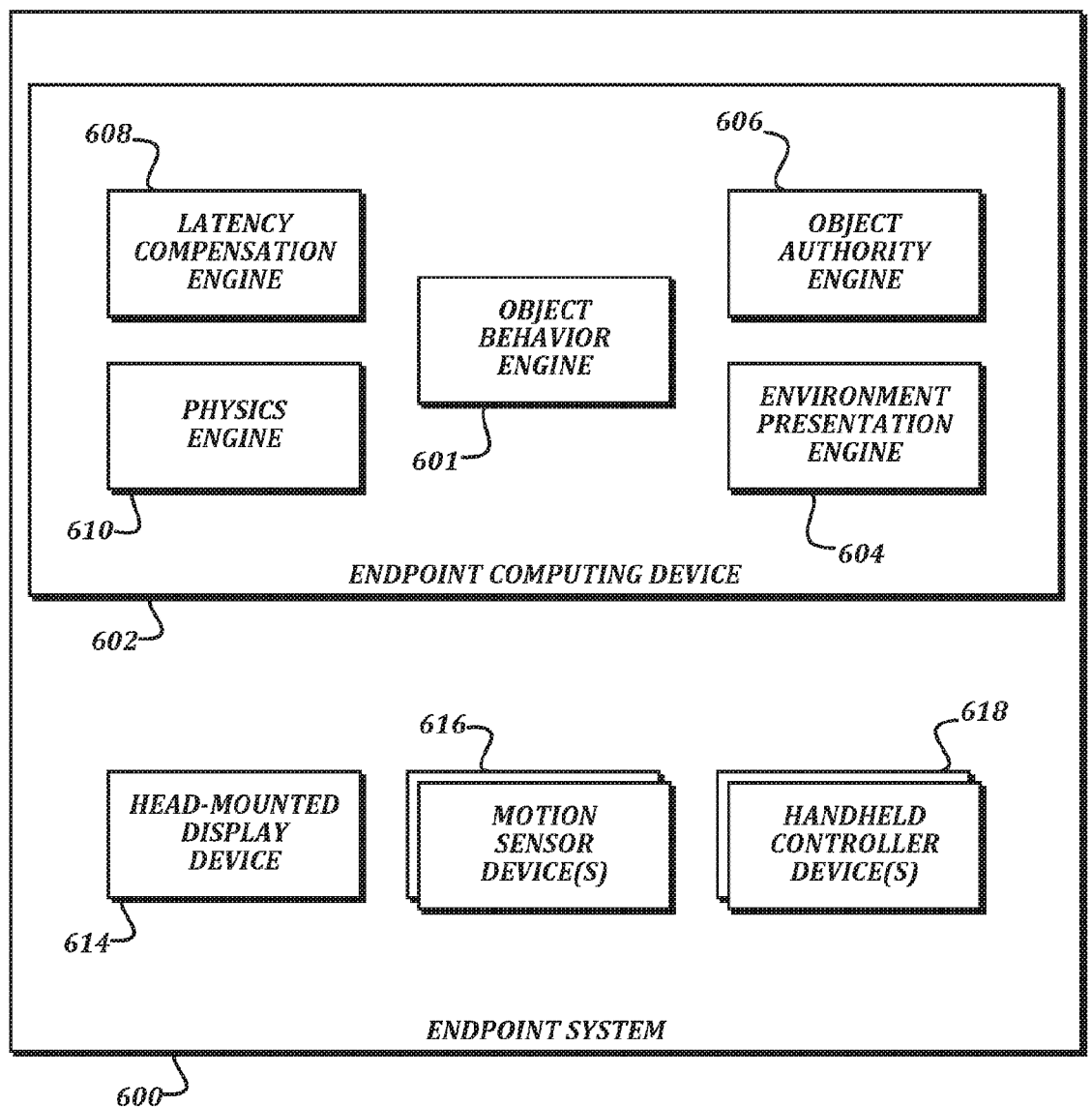
FIG. 6 is a block diagram that illustrates an example embodiment of an endpoint system according to various aspects of the present disclosure.

FIG. 6 is a block diagram that illustrates an example embodiment of an endpoint system according to various aspects of the present disclosure. In the illustrated embodiment, the endpoint system 600 includes an endpoint computing device 602, a head-mounted display device 614, one or more motion sensor devices 616, and one or more handheld controller devices 618.

In some embodiments, the endpoint computing device 602 may be a desktop computing device, a laptop computing device, a tablet computing device, a mobile computing device, or any other type of computing device capable of executing the functionality described herein. The endpoint computing device 602 may have a significant amount of computing and graphic presentation power in order to be able to both execute all of the engines and drive the presentation on the head-mounted display device 614 at a consistently high frame rate. To provide this power, the endpoint computing device 602 may have specialized processors, such as a dedicated graphics card, a physics processing unit, and/or the like.

In some embodiments, the head-mounted display device 614 includes one or more screens, and is configured to be worn on a user's head such that an immersive view of the screens is provided. The head-mounted display device 614 may also include one or more speakers (such as headphones or the like) to provide an audio presentation as well as the video presentation provided by the one or more screens. In some embodiments, the handheld controller devices 618 include one or more input devices such as buttons, trackpads, directional pads, analog sticks, capacitive sensors, and the like. In some embodiments, one of the input devices of the handheld controller devices 618 may be a trigger button. In some embodiments, the handheld controller devices 618 may detect finger states or positions without requiring buttons to be actuated. In some embodiments that are referred to as virtual reality, the head-mounted display device 614 may be opaque, and the screens are the only thing that the user sees during use. In some embodiments that are referred to as augmented reality, the head-mounted display device 614 may have a translucent or transparent display screen, and may allow the user to see objects in the real world along with the objects in the shared virtual environment.

In some embodiments, the motion sensor devices 616 independently detect motion of one or more of the head-mounted display device 614, the handheld controller devices 618, and the user. The motion sensor devices 616 may use any suitable technology to detect the motion, including but not limited to accelerometers, magnetometers, gyroscopes, infrared lasers, depth cameras, photosensors, and computer vision. In some embodiments, multiple motion sensor devices 616 may be located around a room in which the endpoint system 600 is located in order to detect the motion of the head-mounted display device 614, the handheld controller devices 618, and/or the user. In some embodiments, at least some of the motion sensor devices 616 may be incorporated into other devices (such as an accelerometer, magnetometer, and/or gyroscope integrated within the head-mounted display device 614 or handheld controller devices 618.

In some embodiments, the endpoint computing device 602 may be communicatively coupled to the head-mounted display device 614, the motion sensor devices 616, and the handheld controller devices 618 using any suitable communication technology. For example, for the connections between the endpoint computing device 602 and the head-mounted display device 614 or the motion sensor devices 616, high reliability and bandwidth may be desired, and so a suitable high-bandwidth wired communication technique (such as USB 3.0, Thunderbolt, Ethernet, and/or the like) may be used. As another example, for the connections between the endpoint computing device 602 and the handheld controller devices 618, mobility may be a greater concern than bandwidth, and so a wireless communication technique (such as Bluetooth, WiFi, radio frequency (RF) communication, and/or the like) may be used.

In some embodiments, the endpoint computing device 602 is responsible for generating the presentation of the shared virtual environment to the user, for managing the behavior of objects within the shared virtual environment as presented to the user, and for communicating state updates and other environment information with the virtual environment provider system 400 and other endpoint systems. In the illustrated embodiment, the endpoint computing device 602 is configured to provide a latency compensation engine 608, a physics engine 610, an object authority engine 606, and an environment presentation engine 604 in order to provide this functionality.

In some embodiments, the environment presentation engine 604 generates presentations of objects in the shared virtual environment to the user. In some embodiments, the environment presentation engine 604 may generate at least one video feed that includes the presentation of the objects, and provides the at least one video feed to the head-mounted display device 614 to be displayed. In some embodiments, the environment presentation engine 604 may also generate at least one audio feed to be presented via the head-mounted display device 614.

In some embodiments, the physics engine 610 provides a real-time simulation of physical behavior of the objects in the shared virtual environment. As known to one of ordinary skill in the art, a physics engine 610 may provide the simulation by conducting collision detection/collision response actions, rigid body and/or soft body dynamics, fluid dynamics, and/or other processing to determine how objects would interact within the shared virtual environment. In some embodiments, the physics engine 610 may be implemented in software executing on a CPU of the endpoint computing device 602, in software executing in a hardware-accelerated manner on a graphics processing unit (GPU), in dedicated hardware such as a physics processing unit (PPU), or in any combination thereof. Some nonlimiting examples of physics engines 610 that may be suitable for use with the endpoint system 600 include the PhysX engine by Nvidia, the Havok engine by Microsoft Corporation, and the open source Bullet engine.

In some embodiments, the object behavior engine 601 may determine non-physical behavior of objects within the shared virtual environment. As some non-limiting examples of non-physical behavior, the object behavior engine 601 may determine permissions for interacting with an object, may change object states based on game rules or logic, and may detect meaning embedded in interactions detected by the physics engine 610 and respond accordingly (e.g., providing logic that detects collaborative gestures based on object collisions; determining that a collision between a first object and a second object, such as a Frisbee and a target, indicates that a goal in a game has been achieved, and so on).

As described elsewhere herein, object authority over objects within the shared virtual environment is held by the various endpoint systems. Accordingly, the endpoint system 600 will receive location change notifications from other endpoint systems indicating how objects for which the endpoint system 600 does not have object authority should move. The transmission of these notifications will naturally be delayed by some latency in the network 90. In some embodiments, the latency compensation engine 608 is configured help compensate for this latency so that the presentation of objects by the endpoint system 600 can be substantially synchronized with the presentation of the same objects by other endpoint systems 600. In some embodiments, the latency compensation engine 608 is configured to measure latency between the endpoint system 600 and an endpoint system that transmitted a location change notification. While the physics engine 610 may be used to simulate motion of the object to the location indicated in the location change notification, the latency compensation engine 608 helps determine how stale the transmitted location is, and provides information to the physics engine 610 (or the environment presentation engine 604 to allow the animation of the object motion by the endpoint system 600 to eventually be synchronized with the authoritative object motion at the authoritative endpoint system. The latency compensation engine 608 may also help the endpoint computing device 602 compensate for lost or missed location change notifications. Detailed description of these techniques is provided below.

Because the endpoint system 600 manages object authority for objects within the shared virtual environment, in some embodiments, the object authority engine 606 is provided to do so. In some embodiments, the object authority engine 606 is configured to transmit notifications in order to take over object authority for a given object within the shared virtual environment. In some embodiments, the object authority engine 606 is configured to transmit location change notifications based on the locations generated by the physics engine 610 or the object behavior engine 601 for objects for which the endpoint system 600 has taken over object authority.

As described herein, the engines of the endpoint computing device 602 manage the shared virtual environment using a model-view-controller paradigm. That is, for any given object within the shared virtual environment, a data structure representing a model of the object is maintained by the endpoint computing device 602. The latency compensation engine 608, physics engine 610, object behavior engine 601, and object authority engine 606 make changes to the model of the object and therefore act as controllers. The environment presentation engine 604 generates a presentation based on the model of the object, and therefore acts as a view. In some embodiments, other software design paradigms may be used, and so the functionality described below may be split differently, or may be performed by different engines. In some embodiments, the engines described herein may be combined with each other. In some embodiments, multiple copies of a single engine may be present. In some embodiments, functionality described as originating from a given engine may in other embodiments be performed by a different engine.

In some embodiments, some of the devices illustrated in FIG. 6 may be combined with other devices, or some components may be in different devices than illustrated in FIG. 6. For example, in some embodiments, the physics engine 610 and/or the environment presentation engine 604 may be provided by dedicated devices separate from the endpoint computing device 602, or may be provided by the head-mounted display device 614. In some embodiments, the motion sensor devices 616 may track the hands of the user accurately enough to allow the handheld controller devices 618 to be omitted. The below description will refer to embodiments that use handheld controller devices 618 for the sake of clarity. However, the description should not be seen as limiting the disclosure this embodiment, and should instead be seen as encompassing embodiments wherein the handheld controller devices 618 are missing and corresponding user input is obtained through the motion sensor devices 616 alone.

In some embodiments, commercially available hardware may be used for the head-mounted display device 614, the motion sensor devices 616, and the handheld controller devices 618. Some nonlimiting examples of such hardware include the Rift headset and Touch controllers from Oculus VR, LLC; the HTC Vive headset and SteamVR controllers from HTC and Valve Corporation; and the HoloLens headset from Microsoft Corporation. While these examples are provided, one of ordinary skill in the art will understand that the examples are not intended to be limiting, but that other hardware from other manufacturers may instead be used in some embodiments of the present disclosure.

Figure 7:
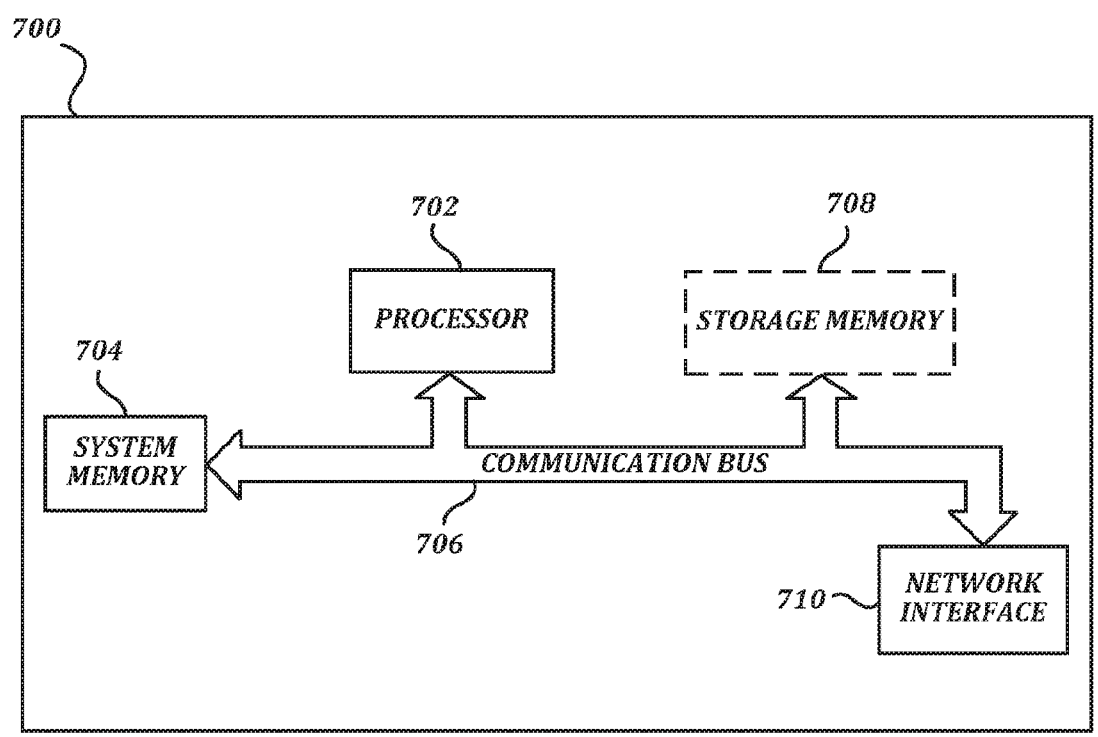
FIG. 7 is a block diagram that illustrates aspects of an exemplary computing device appropriate for use with embodiments of the present disclosure.

FIG. 7 is a block diagram that illustrates aspects of an exemplary computing device appropriate for use with embodiments of the present disclosure. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 700 may be any one of any number of currently available or yet to be developed devices.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or similar memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, LTE, WiMAX, Bluetooth, and/or the like.

In the exemplary embodiment depicted in FIG. 7, the computing device 700 also includes a storage medium 708. However, services may be accessed using a computing device that does not include means for persisting data to a local storage medium. Therefore, the storage medium 708 depicted in FIG. 7 is represented with a dashed line to indicate that the storage medium 708 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 704 and storage medium 708 depicted in FIG. 7 are merely examples of computer-readable media.

Suitable implementations of computing devices that include a processor 702, system memory 704, communication bus 706, storage medium 708, and network interface 710 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, USB, or other suitable connections protocols using wireless or physical connections. Similarly, the computing device 700 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

Figure 8A:
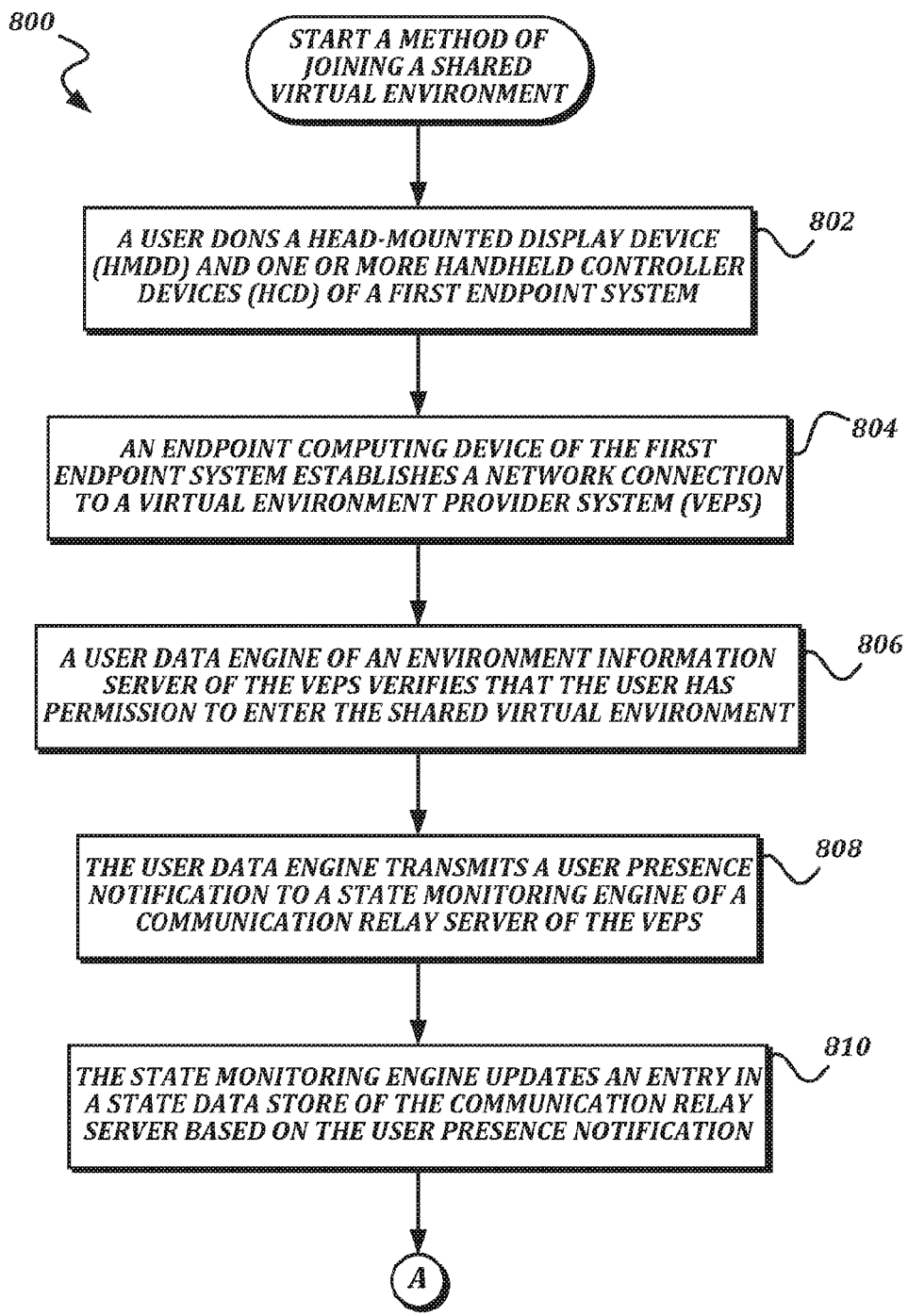
FIGS. 8A-8B are a flowchart that illustrates an example embodiment of a method of joining a shared virtual environment according to various aspects of the present disclosure.
Figure 8B:
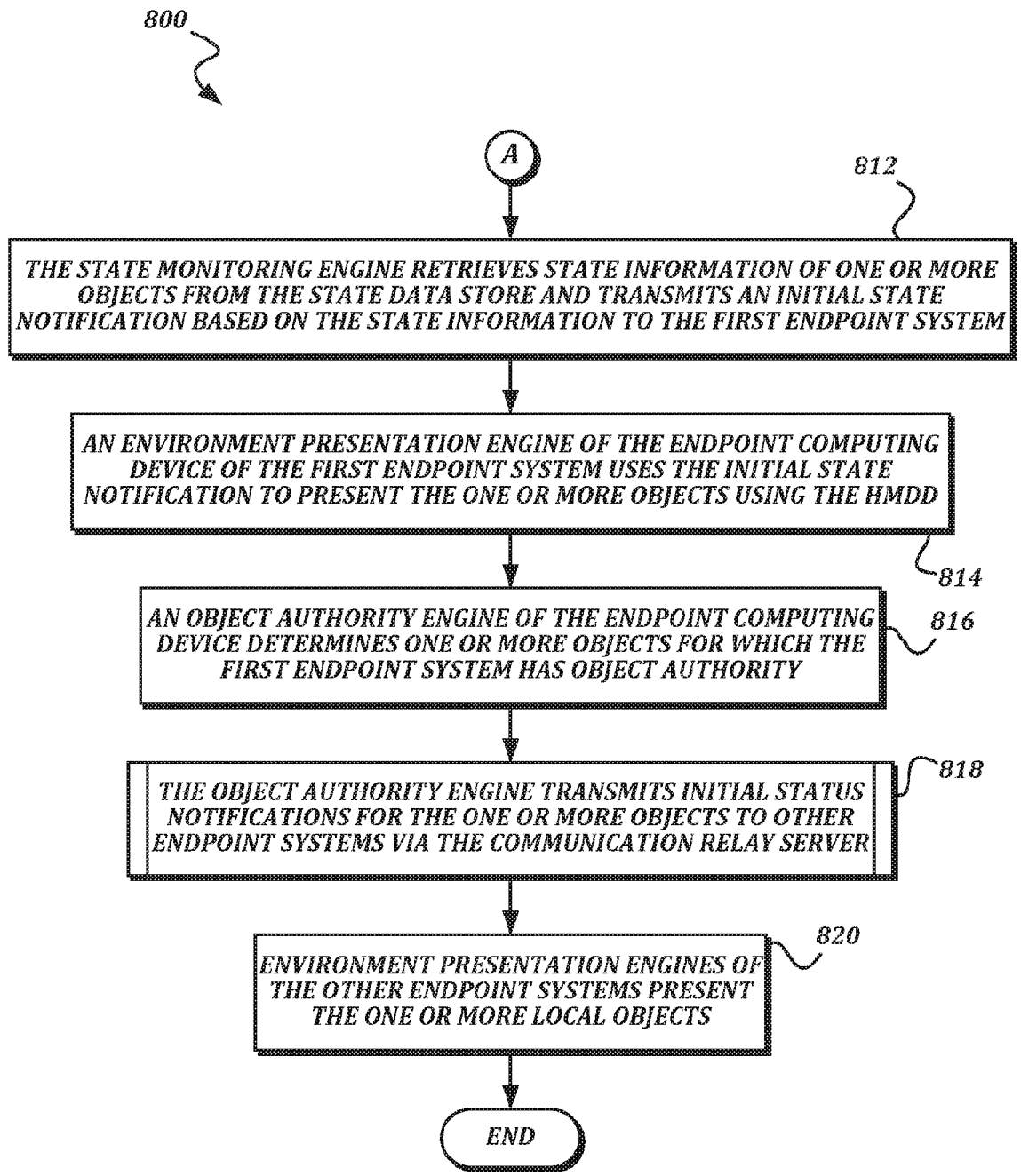

FIGS. 8A-8B are a flowchart that illustrates an example embodiment of a method of joining a shared virtual environment according to various aspects of the present disclosure. From a start block, the method 800 proceeds to block 802, where a user dons a head-mounted display device (HMDD) 614 and one or more handheld controller devices (HCD) 618 of a first endpoint system 402. At block 804, an endpoint computing device 602 of the first endpoint system 402 establishes a network connection to a virtual environment provider system (VEPS) 400. In some embodiments, establishing the network connection to the virtual environment provider system 400 may include a clock synchronization handshake, an exchange of user credentials, an exchange of encryption keys, and/or transmission of other information for establishing the connection. Next, at block 806, a user data engine 552 of an environment information server 408 of the virtual environment provider system 400 verifies that the user has permission to enter the shared virtual environment. In some embodiments, the user data engine 552 may check user credentials submitted in block 804 against an entry in the user data store 558 in order to verify permission. In some embodiments, permission may also be conditioned on aspects of the network connection itself, such as having at least a minimum amount of bandwidth and/or having no more than a maximum allowable latency.

Once permission is verified, the method 800 proceeds to block 808, where the user data engine 552 transmits a user presence notification to a state monitoring engine 506 of a communication relay server 410 of the virtual environment provider system 400. At block 810, the state monitoring engine 506 updates an entry in a state data store 504 of the communication relay server 410 based on the user presence notification. In some embodiments, storing information from the user presence notification in the state data store 504 allows the communication relay server 410 to quickly inform newly connecting endpoint systems 600 about which other endpoint systems 600 are currently participating in the shared virtual environment. The entry may include a network address (such as an IP address and/or the like) by which notifications can be sent to the first endpoint system 402.

The method 800 then proceeds to a continuation terminal ("terminal A"). From terminal A (FIG. 8B), the method 800 proceeds to block 812, where the state monitoring engine 506 retrieves state information of one or more objects from the state data store 504 and transmits an initial state notification based on the state information to the first endpoint system 402. The initial state notification may include the last stored location, velocity, and/or other aspects of the objects. At block 814, an environment presentation engine 604 of the first endpoint system 402 uses the initial state notification to present the one or more objects using the head-mounted display device 614. The initial state notification allows the environment presentation engine 604 of the first endpoint system 402 to know where the objects should be presented within the shared virtual environment. In some embodiments, the initial state notification may include object identifiers for the objects, and the first endpoint system 402 may retrieve models, textures, logic, or other detailed information about the objects from the object data engine 554 of the environment information server 408. In some embodiments, the initial state notification may include the models, textures, logic, or other detailed information about the objects. In some embodiments, the detailed information about the objects may already be present on the first endpoint system 402, and an object identifier in the initial state notification is enough for the first endpoint system 402 to understand how to present the object.

Figure 9:
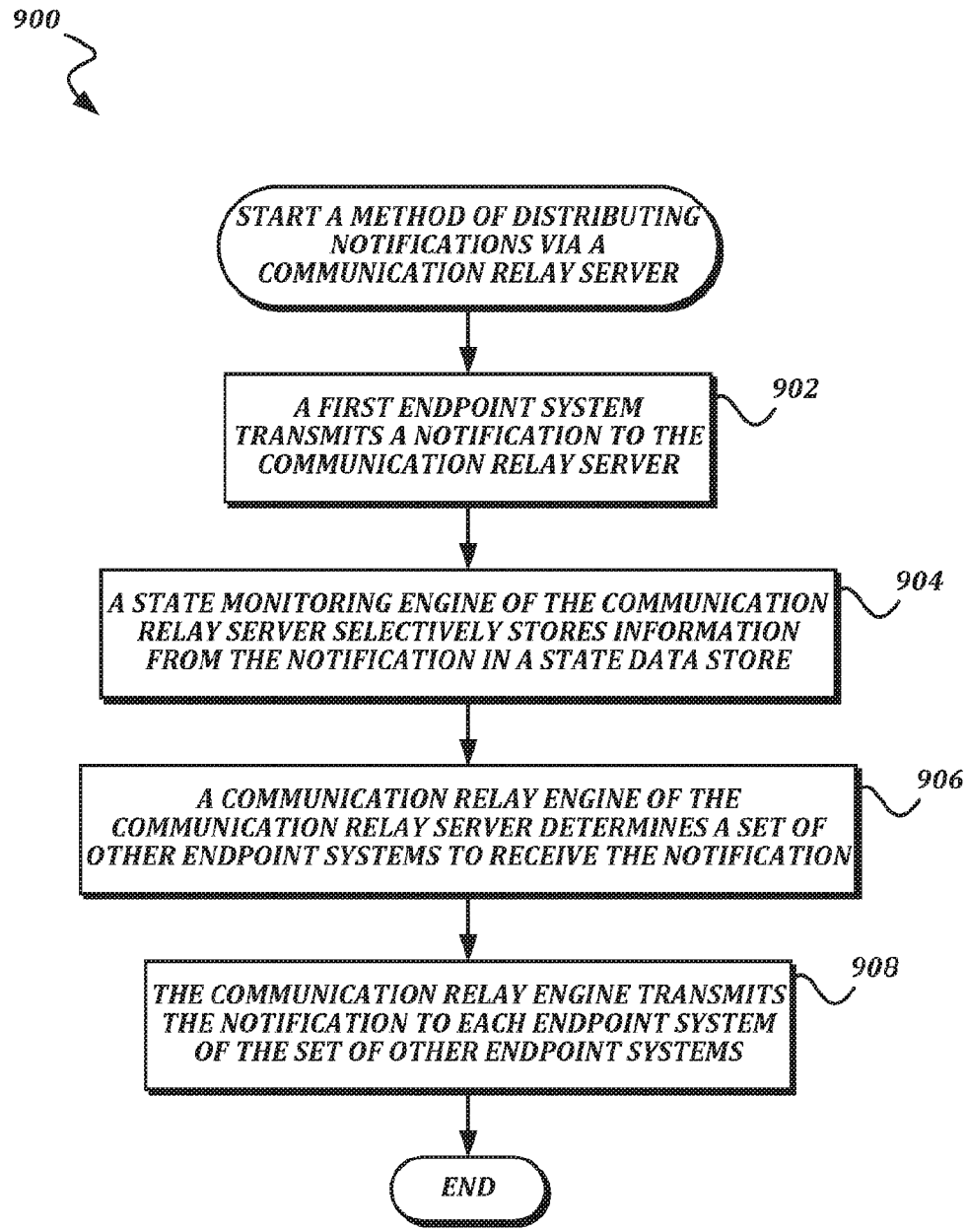
FIG. 9 is a flowchart that illustrates an example embodiment of a method of distributing notifications via a communication relay server according to various aspects of the present disclosure.
Figure 12A:
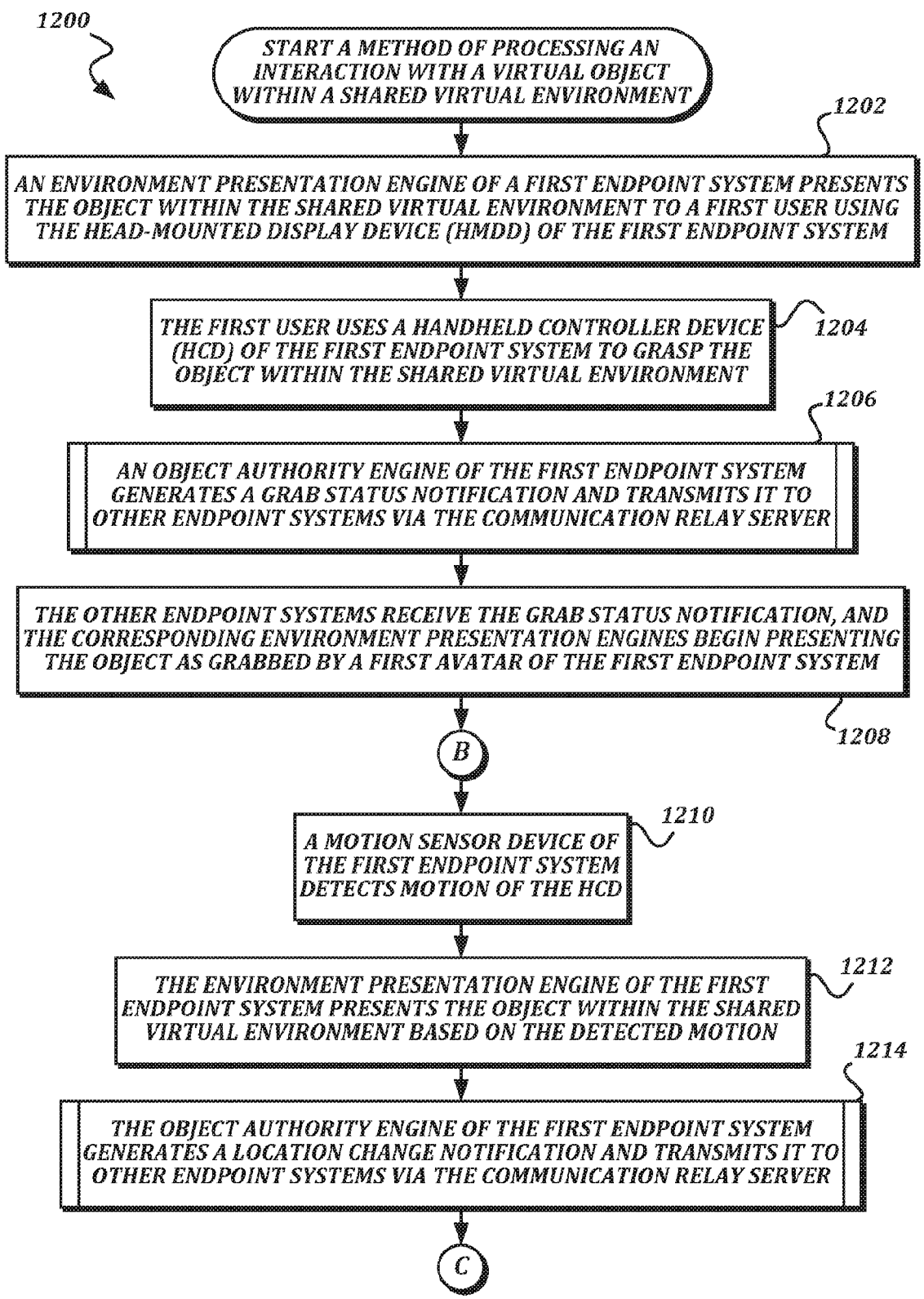
FIGS. 12A-12G are a flowchart that illustrates a method of processing an interaction with a virtual object within a shared virtual environment according to various aspects of the present disclosure.
Figure 12B:
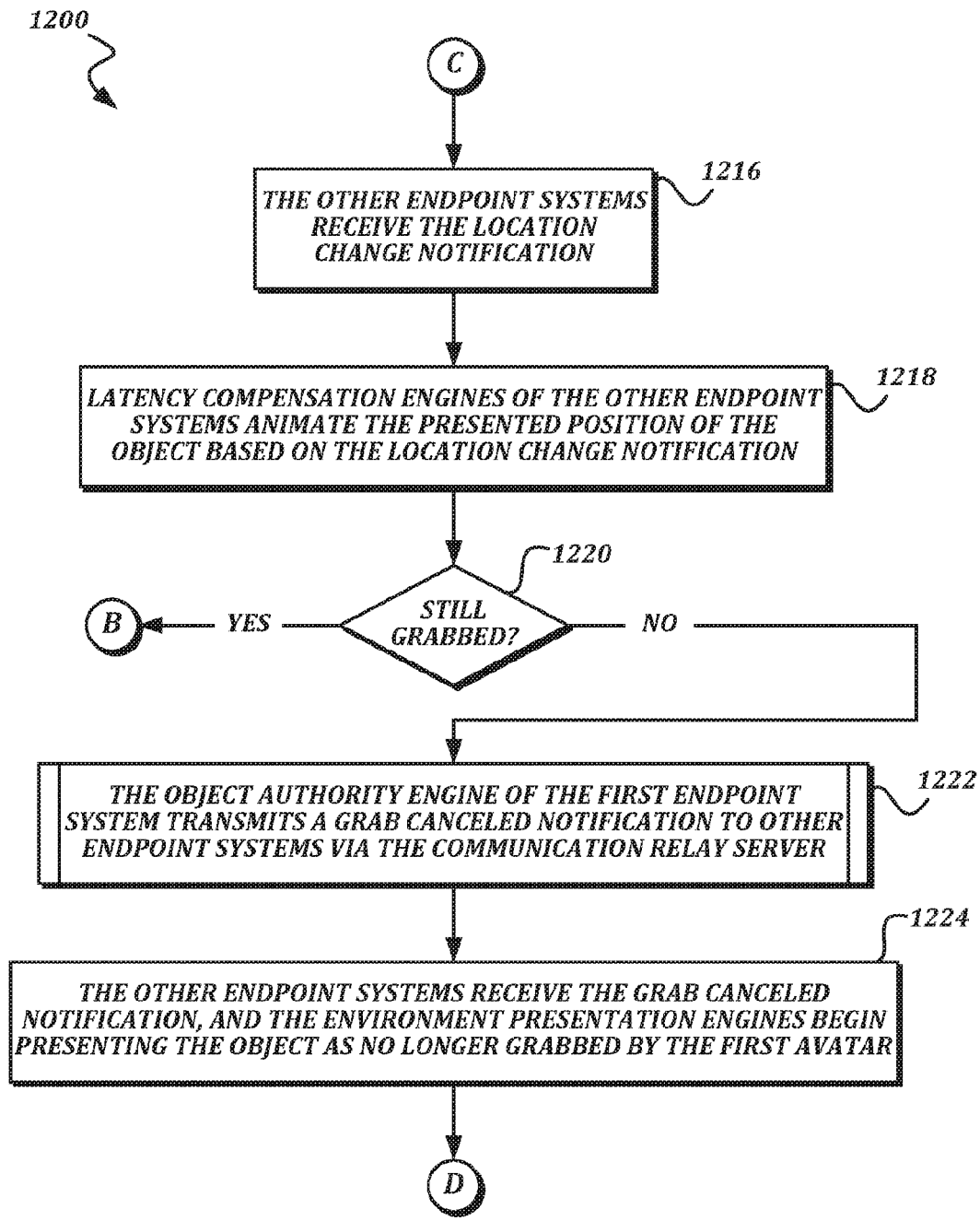
Figure 12C:
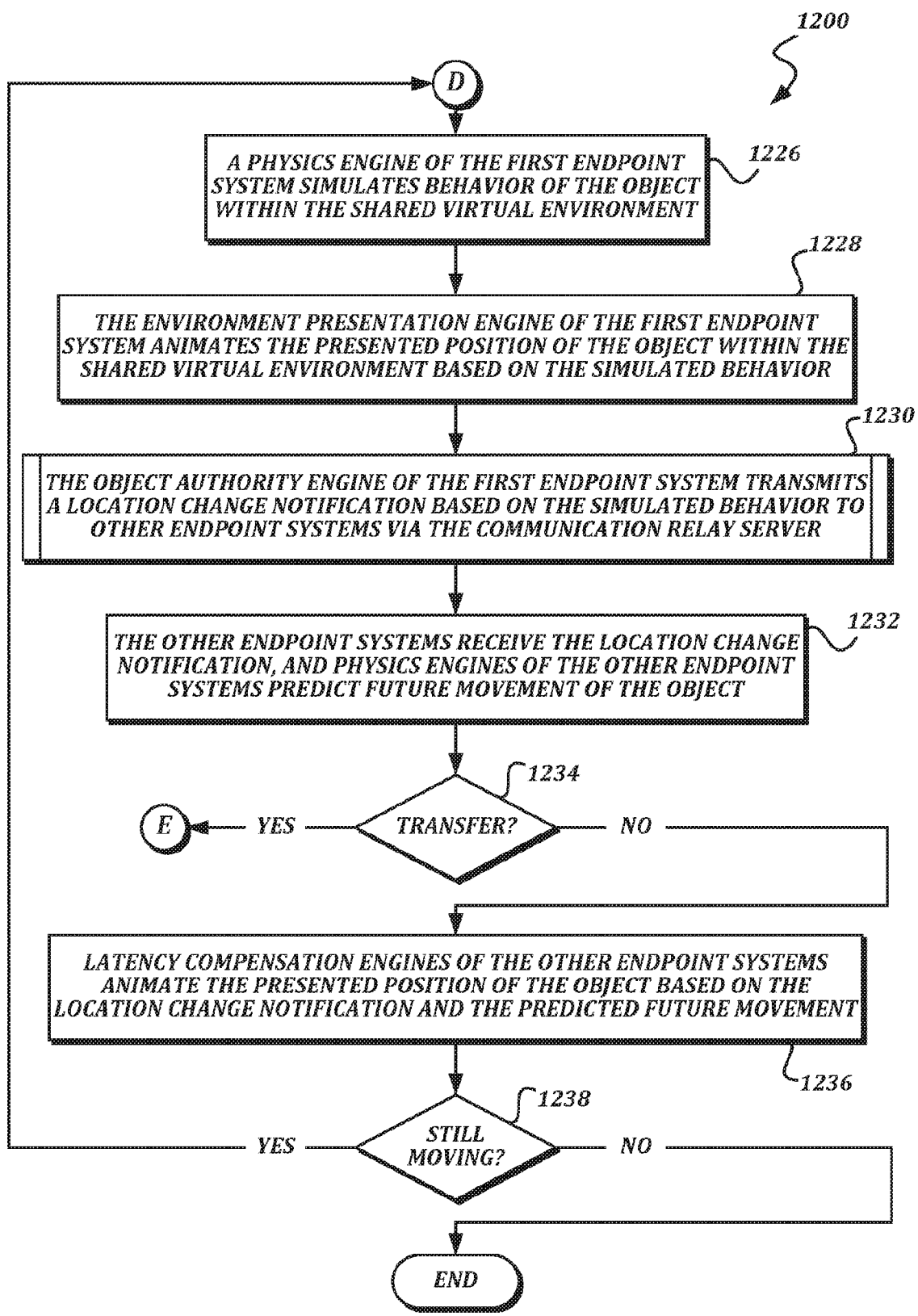
Figure 12D:
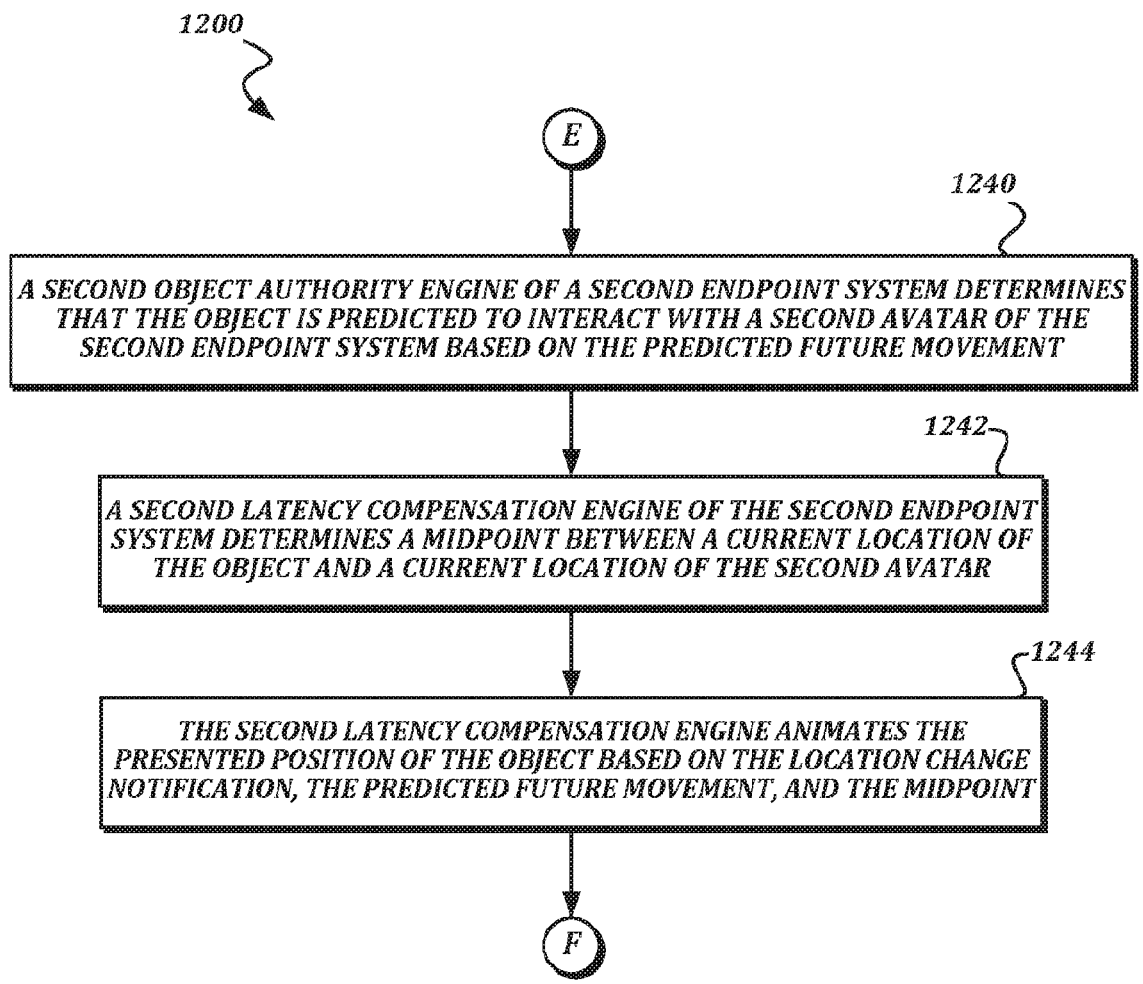
Figure 12E:
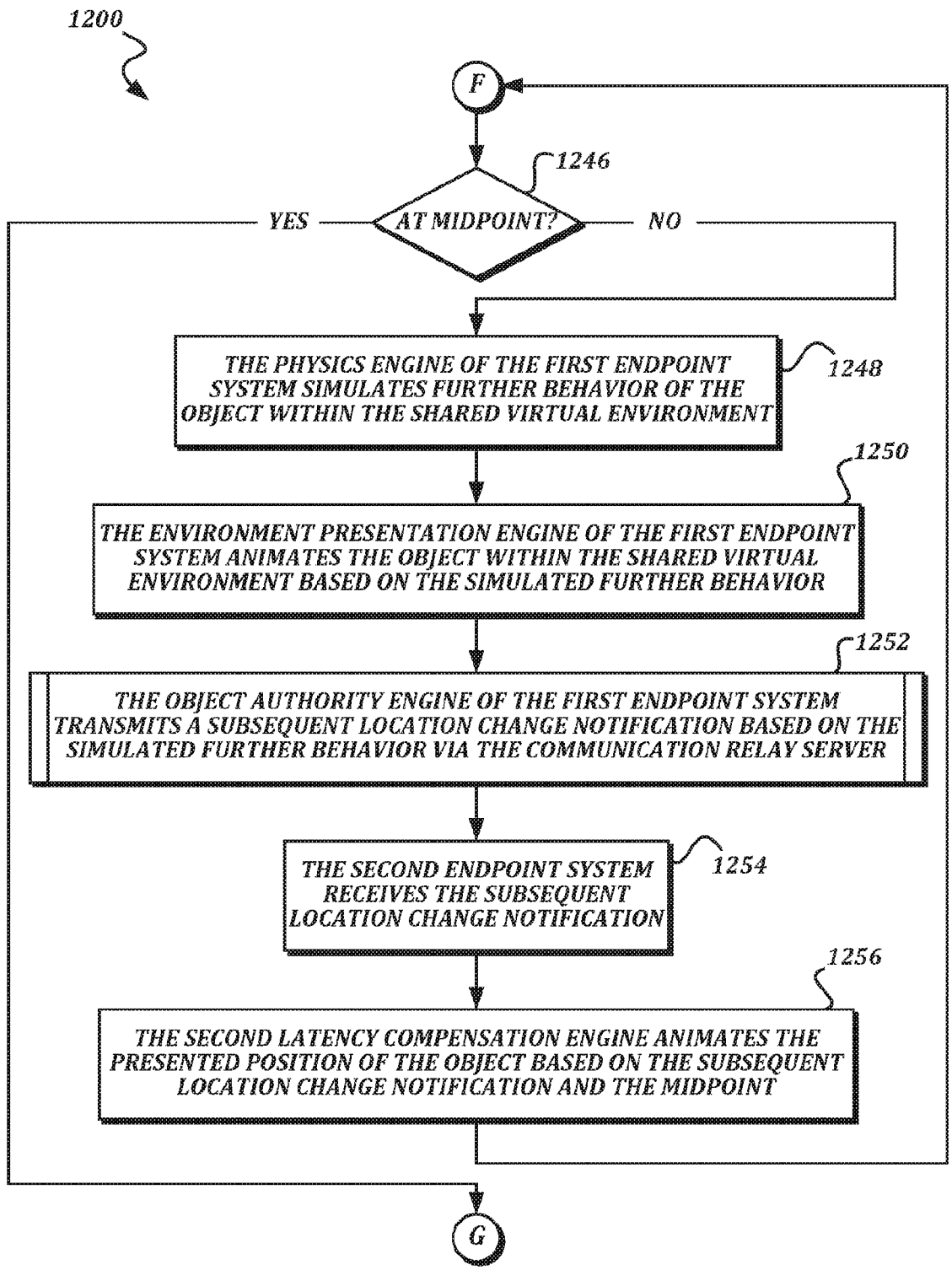
Figure 12F:
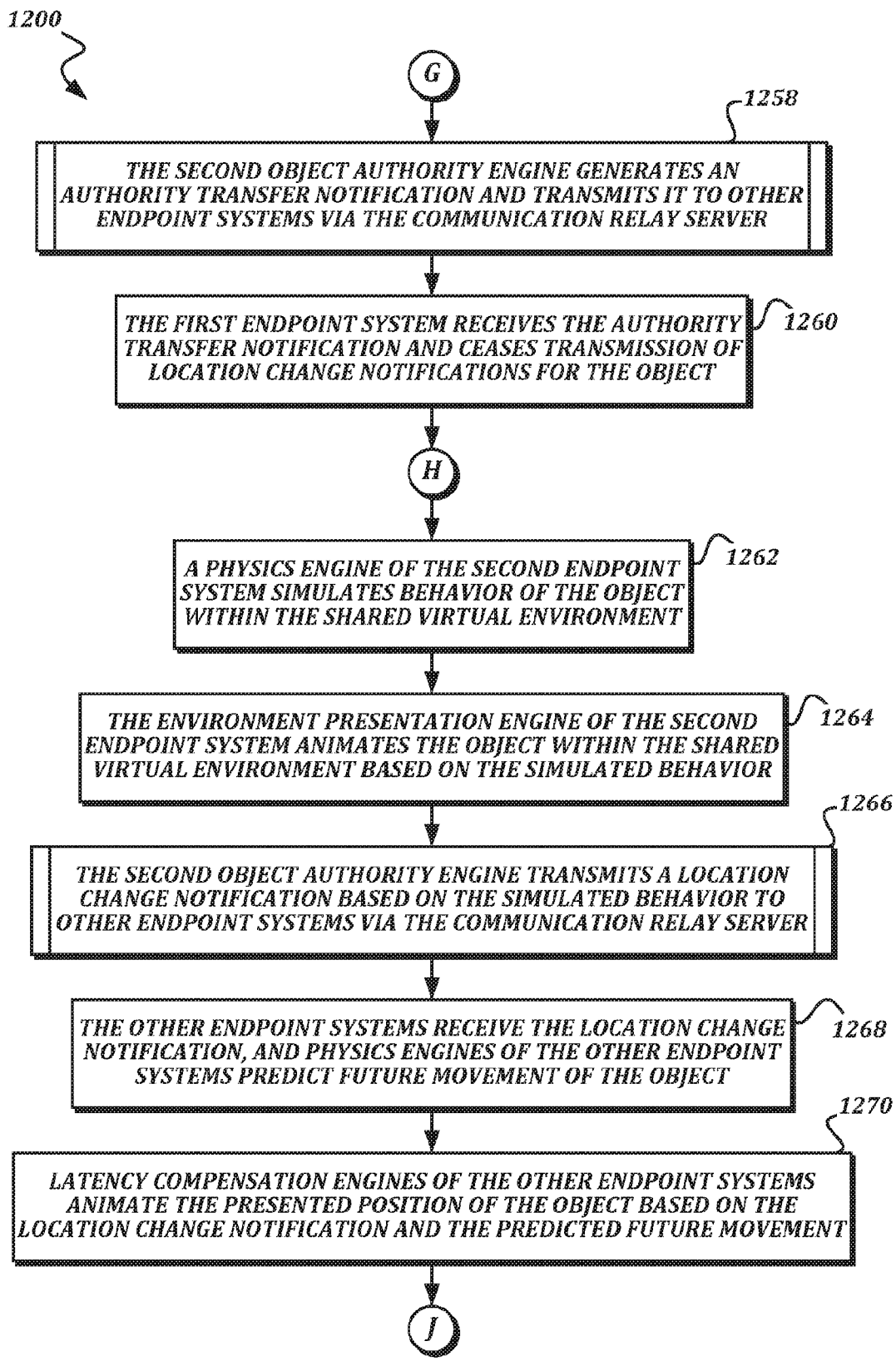
Figure 12G:
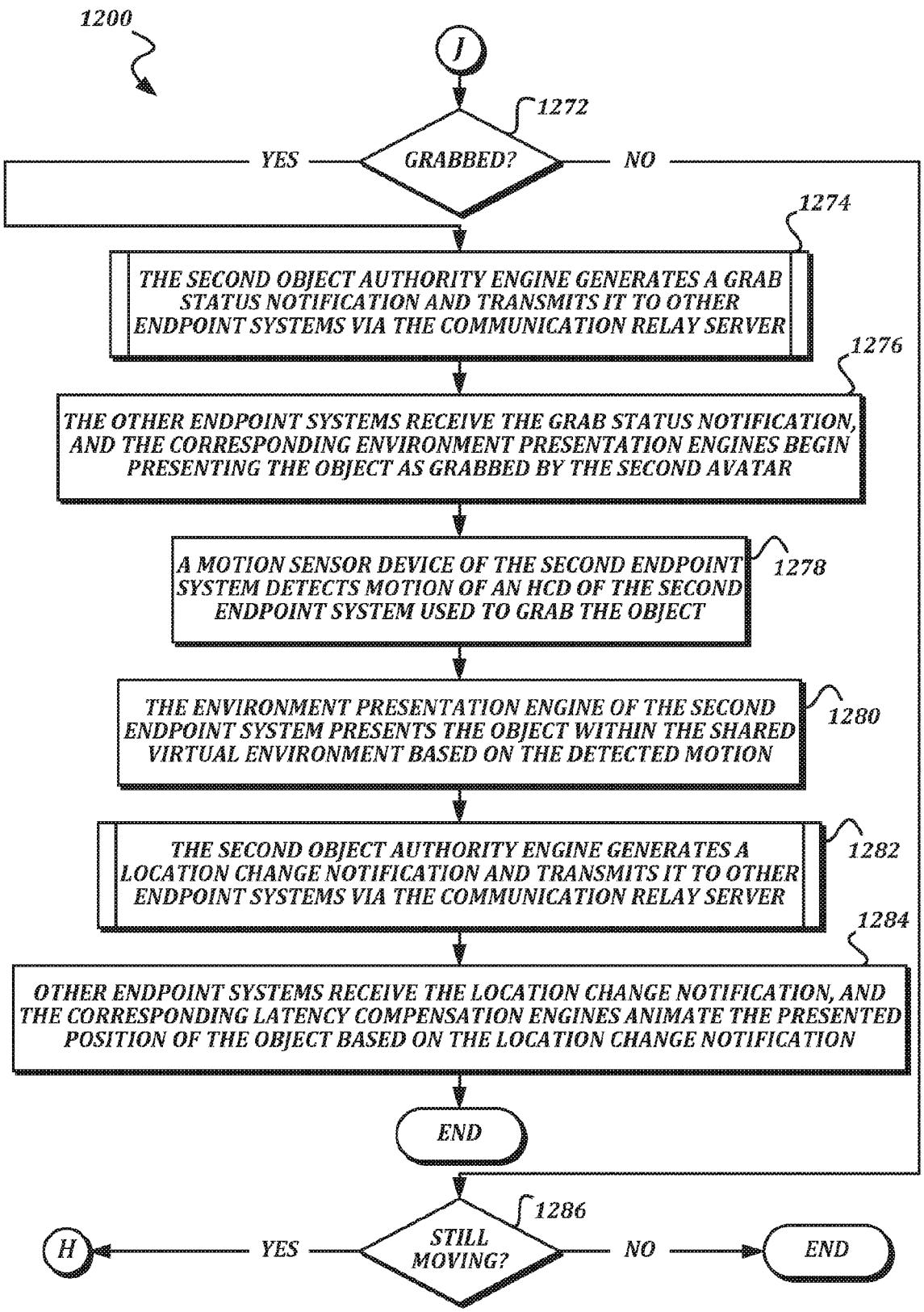

At block 816, an object authority engine 606 of the endpoint computing device 602 determines one or more objects for which the first endpoint system 402 has object authority. The objects for which the first endpoint system 402 has object authority include at least objects associated with movement of an avatar associated with the first endpoint system 402. For example, in some embodiments, the first endpoint system 402 may initially have object authority over a head object and two hand objects that are associated with the avatar. In some embodiments, the first endpoint system 402 may also initially have object authority over other objects from the initial state notification that are positioned close to the avatar. The method 800 then proceeds to procedure block 818, where the object authority engine 606 transmits initial status notifications for the one or more objects to other endpoint systems via the communication relay server 410. Any suitable technique for transmitting the notifications via the communication relay server 410 may be used. An example method suitable for use in procedure block 818 is illustrated in FIG. 9 and described in the accompanying text. At block 820, environment presentation engines 604 of the other endpoint systems 600 present the one or more local objects. The presentations on the other endpoint systems 600 use the initial status notifications to determine where to present the objects. The method 800 then proceeds to an end block and terminates. Once the method 800 has concluded, the user of the first endpoint system 402 has entered the shared virtual environment. The first endpoint system 402 will continue to present the shared virtual environment after the method 800 completes.

FIG. 9 is a flowchart that illustrates an example embodiment of a method of distributing notifications via a communication relay server according to various aspects of the present disclosure. As stated above, the method 900 is suitable for use in procedure block 818, as well as in other appropriate procedure blocks throughout the present disclosure. The method 900 may be used to reduce bandwidth requirements, particularly on asymmetric connections at the endpoint systems where upload bandwidth is more limited than download bandwidth.

From a start block, the method 900 proceeds to block 902, where a first endpoint system 402 transmits a notification to the communication relay server 410. Next, at block 904, a state monitoring engine 506 of the communication relay server 410 selectively stores information from the notification in a state data store 504. In some embodiments, the state monitoring engine 506 only stores information from notifications that are not merely ephemeral. For example, the state monitoring engine 506 may not store information from location change notifications, because the information is likely to change very quickly, and the overhead of storing the information in the state data store 504 would not be worth it. However, if the state monitoring engine 506 determines that a location change notification indicates that an object has come to rest (for example, the location information in two or more consecutive location change notifications is identical, or the velocity in a location change notification is zero), the state monitoring engine 506 may store such information in the state data store 504 because it is not likely to change soon. This may also be useful because if a new endpoint system joins the shared virtual environment after the object has come to rest, the new endpoint system would have no other way of knowing the location of the object unless the state monitoring engine stores the location in the state data store 504 and provides it with the initial state notification, because the new endpoint system would not have received any of the past location change notifications. As another example, the state monitoring engine 506 may store other information that is not as ephemeral as location, including but not limited to grab status, game scores, game event notifications, and/or the like.

At block 906, a communication relay engine 502 of the communication relay server 410 determines a set of other endpoint systems to receive the notification. In some embodiments, the communication relay engine 502 may determine which other endpoint systems are participating in the shared virtual environment by checking the entries in the state data store 504, and may use the entries to determine network addresses at which the other endpoint systems can receive communication. Next, at block 908, the communication relay engine 502 transmits the notification to each endpoint system of the set of other endpoint systems. The transmission may use the network addresses that were retrieved from the entry in the state data store 504. The method 900 then proceeds to an end block and terminates.

In the method 900, any suitable transmission technique may be used for the notifications in blocks 902 and 908. In some embodiments, the notifications may be transmitted using a connectionless transmission technique that is appropriate for time-sensitive applications. One suitable technique is the use of user datagram protocol (UDP) packets, though other techniques could be used. The description above of method 900 refers to a "first endpoint system" for clarity. One of ordinary skill in the art will recognize that this method 900 could be used by any endpoint system described herein.

As discussed above, it is desirable to provide object authority to a given endpoint system when the given endpoint system is interacting with an object in the shared virtual environment in order to improve the immersiveness of the shared virtual environment on the given endpoint system. While the transfer of object authority illustrated in FIGS. 3A-3B appears straightforward, problems nevertheless arise in implementation. Notably, the latency of communication between the endpoint systems can give rise to desynchronization of the state of moving objects, and compensating for this desynchronization can lead to disorienting artifacts. FIGS. 10A-10D are schematic illustrations that illustrate how artifacts due to latency may arise if object authority is transferred in a naïve manner in a game of catch between avatars. These schematic illustrations represent states of the shared virtual environment as presented by a first endpoint system associated with a first avatar, and states of the shared virtual environment as presented by a second endpoint system associated with a second avatar. The illustrations are described below as showing actions taken by avatars within the shared virtual environment for ease of discussion and for clarity. One of ordinary skill in the art will understand that this is shorthand for detecting user motions and/or inputs that cause the avatar to be presented as performing the actions.

Referring first to FIG. 10A, the state of the first endpoint system 1002 includes the first avatar 1004, the second avatar 1006, and an object (as illustrated, a ball 1008). Because the first avatar 1004 is grabbing the ball 1008, the first endpoint system has object authority for the ball. The state of the second endpoint system 1052 also includes the first avatar 1054, the second avatar 1056, and the ball 1058.

FIG. 10B illustrates the state of the system shortly after the first avatar has thrown the ball at the second avatar, and the second endpoint system has received the location change notification from the first endpoint system after some latency. In the state of the first endpoint system 1002, the ball 1008 is travelling away from the first avatar 1004, because the first endpoint system has object authority for the ball 1008 and can directly present the output of its physics engine 610 for the ball 1008. In the state of the second endpoint system 1052, however, no change from the previous state has yet occurred, because the second endpoint system has only just received the location change notification and has not yet moved the ball 1058 to the location indicated in the location change notification.

FIG. 10C illustrates the state of the system at a later point in time. In the state of the first endpoint system 1002, the ball 1008 has continued traveling according to the calculations performed by the physics engine 610 of the first endpoint system, and is close to arriving at the second avatar 1006. In the state of the second endpoint system 1052, the ball 1058 is traveling according to the location change notifications received by the second endpoint system, but as shown, the latency has caused the presentation of the ball 1058 to continue to lag behind the authoritative location generated by the first endpoint system. As such, the ball 1058 is not yet close to arriving at the second avatar 1056.

While these differences in state introduced by latency may not yet be noticeable, FIG. 10D illustrates how the differences can become very problematic. Because the avatars are playing catch, the second avatar may either catch the ball or drop the ball. However, due to the latency, the first endpoint system will not know whether or not the ball was caught until after it needs the information for a consistent presentation. Even assuming that the second endpoint system has been assigned object authority and is allowed to interact authoritatively with the ball when it arrives, the lack of synchronization of the states will cause a clear discontinuity at the first endpoint system.

As shown, in the state of the first endpoint system 1002, the first endpoint system has not yet received a location change notification from the second endpoint system, and so will continue updating the position of the ball 1008 using its physics engine 610. In the absence of any other information, the physics engine 610 would likely model a collision between the ball 1008 and the second avatar 1006, and the ball 1008 would bounce off. Meanwhile, in the state of the second endpoint system 1052, the ball 1058 is just arriving at the second avatar 1056. If the second avatar 1056 fails to catch the ball 1058, then the state of the first endpoint system 1002 may still just be ahead of where the state of the second endpoint system 1052 will eventually end up. However, if the second avatar 1056 does successfully catch the ball 1058, then a serious discontinuity between the state of the first endpoint system 1002 and the state of the second endpoint system 1052 has arisen, with no clear way of resolving the discontinuity that maintains the immersive nature of the shared virtual environment. Causing the ball 1008 to simply reverse course or otherwise warp to a "caught" position reported in a location change notification sent by the second endpoint system can be badly disorienting to the user of the first endpoint system. Though a game of catch is described as a simple illustrative case, one of ordinary skill in the art will recognize that such an example can be applied to any situation where latency can cause a noticeable difference in state between the endpoint systems. What is desired are techniques for avoiding such disorienting discontinuities.

To help solve these problems in some embodiments of the present disclosure, the second endpoint system claims object authority when it determines that it is the next endpoint that is most likely to interact with an object, instead of waiting until the interaction. The endpoint system that previously has object authority performs physics simulation of the object and transmits location change notifications to other endpoint systems. Those other endpoint systems run their own physics simulations of the object using the location change notifications as input to extrapolate future positions, and the other endpoint systems interpolate between the locations specified in the location change notifications and the extrapolated future position in order to smoothly synchronize the presented local state with the authoritative state managed by the endpoint system that previously has object authority. When a second endpoint system determines, from the extrapolated future positions, that it is likely to interact with the object, it synchronizes its presented local state with the authoritative state managed by the endpoint system that previously has object authority at some point while the object is still traveling, and then takes object authority in order to locally simulate the object the rest of the way to the interaction.

FIGS. 11A-11G are schematic illustrations that illustrate an example technique for avoiding synchronization discontinuities according to various aspects of the present disclosure. Referring first to FIG. 11A, the state of the first endpoint system 1102 and the state of the second endpoint system 1152 are similar to that illustrated in FIG. 10A. That is, the state of the first endpoint system 1102 includes the first avatar 1104, the second avatar 1106, and an object (the ball 1108). The state of the second endpoint system 1152 includes the first avatar 1154, the second avatar 1156, and the ball 1158. Because the first avatar 1104 is grabbing the ball 1108, the first endpoint system has object authority over the ball.

FIG. 11B illustrates the state of the system shortly after the first avatar has thrown the ball at the second avatar, and the second endpoint system has received the location change notification from the first endpoint system after some latency. Similar to FIG. 10B, in the state of the first endpoint system 1102, the ball 1108 is travelling away from the first avatar 1104, because the first endpoint system has object authority for the ball 1108 and can directly present the output of its physics engine 610 for the ball 1008. In the state of the second endpoint system 1052, no change has yet occurred to the presentation of the ball 1058. However, the latency compensation engine 608 of the second endpoint system received the location change notification. The latency compensation engine 608 uses the location from the location change notification along with a measure of the latency between the first endpoint system and the second endpoint system to extrapolate a predicted current location 1160 for the ball. As shown, the predicted current location 1160 is the same distance from the first avatar 1154 in the state of the second endpoint system 1152 as the distance of the ball 1108 from the first avatar 1104 in the state of the first endpoint system 1102.

The latency compensation engine 608 and physics engine 610 of the second endpoint system then start moving the presentation of the ball 1158 towards the predicted current location 1160. The current presented position and the predicted current location 1160 may be treated as key frames, and positions for the ball 1158 between the current presented position and the predicted current location 1160 may be interpolated therebetween using any suitable technique, including but not limited to linear interpolation, splines, polynomial interpolation, and the like.

As a simplified, illustrative example where virtual distances are measured in meters, the first avatar may be located at location X=0. The first avatar may throw the ball 1108 at time=0 with an X-velocity of +1 meter/second. The first endpoint system may transmit a location change notification at time=0.1 seconds, indicating that the ball 1108 is now at X=0.1, and has an X-velocity of +1 meter/second. The second endpoint system may receive the location change notification at time=0.3 seconds (i.e., after 0.2 seconds of latency). The latency compensation engine 608 of the second endpoint system then determines that the predicted current location 1160 should be X=0.3, because the location change notification indicated a location of X=0.1, and the ball had been travelling for an additional 0.2 seconds.

Once the ball has been released by the first avatar, the second endpoint system may determine, based on its extrapolation of the future path of the ball 1158, that the second avatar 1156 is likely to interact with the ball 1158. Accordingly, the second endpoint system prepares to assume object authority over the ball 1158 by determining a midpoint of travel between the first avatar 1154 and the second avatar 1156. FIG. 11C illustrates the state of the second endpoint system 1152 with the calculated midpoint 1162 visible. The state of the first endpoint system 1112 also has the midpoint 1112 illustrated, though in some embodiments the first endpoint system may not determine the midpoint 1112 because it is not needed by the first endpoint system.

After determining that the second avatar 1156 is likely to interact with the ball 1158 and calculating the midpoint 1162, the latency compensation engine 608 of the second endpoint system generates interpolated positions for the ball 1158 such that the presented location of the ball 1158 will catch up to the predicted current location 1160 at the midpoint 1162. Accordingly, as shown in FIG. 11C, the ball 1108 in the state of the first endpoint system 1102 continues to travel at the same speed toward the second avatar 1106. A subsequent location change notification is received by the second endpoint system, and a new predicted current location 1160 is generated. The presentation of the ball 1158 in the state of the second endpoint system 1152 is traveling with a greater velocity than the presentation of the ball 1108 in the state of the first endpoint system 1102. In some embodiments, the interpolation of states may use a curve such that the velocity in the state of the second endpoint system 1152 is initially high, but slows down to match the velocity in the state of the first endpoint system 1102 by the time it reaches the midpoint 1160.

FIG. 11D illustrates the state of the first endpoint system 1102 and the state of the second endpoint system 1152 once the ball has reached the midpoint. The ball 1108 has reached the midpoint 1112 in the state of the first endpoint system 1102, and has also reached the midpoint 1162 in the state of the second endpoint system 1152. As such, the predicted current location 1160 and the presented location of the ball 1158 are in the same place, even though a location included in a most recently received location change notification would have been behind the presented location of the ball 1158 and the predicted current location 1160. The second endpoint system then transmits an authority transfer notification to take object authority over the ball.

FIG. 11E illustrates a state of the first endpoint system 1102 and a state of the second endpoint system 1152 after the second endpoint system has taken object authority and the first endpoint system has received a location change notification from the second endpoint system. For the purposes of the illustration, it is assumed that the location change notification was transmitted at the same time as the authority transfer notification, such that it represents the location of the ball 1158 when it has reached the midpoint 1162. The state of the second endpoint system 1152 shows that the motion of the ball 1158 is now being authoritatively simulated by the physics engine 610 of the second endpoint system, and is therefore traveling at a velocity as calculated by the physics engine 610 of the second endpoint system. The state of the first endpoint system 1102 shows that the ball 1108 continued on its path at the velocity and positions previously calculated by the physics engine 610 of the first endpoint system, but the first endpoint system has now received a location change notification from the second endpoint system. Due to the latency between the first endpoint system and the second endpoint system, the location indicated in the location change notification 1110 is lagging behind the ball 1108 as presented by the first endpoint system.

FIG. 11F illustrates the state of the first endpoint system 1102 and the state of the second endpoint system 1152 as the first endpoint system begins to compensate for the latency of the location change notifications. In the state of the second endpoint system 1152, the ball 1158 continues to travel as simulated by the physics engine 610 of the second endpoint system. In the state of the first endpoint system 1102, the latency compensation engine 608 of the first endpoint system has begun generating interpolated positions of the ball 1108 with a target of having the ball 1108 not reach the second avatar 1106 until the location change notification indicating that the ball 1108 has reached the second avatar 1106 is received by the first endpoint system. In other words, the latency compensation engine 608 will slow down the travel of the ball 1108 slower than that specified by the physics engine 610 of the first endpoint system, such that the ball 1108 will arrive at the second avatar 1106 later than physics alone would specify by an amount of time determined by the latency. Hence, in FIG. 11F, the ball 1108 is shown travelling slower than in FIG. 11E, and getting closer to the location 1110 specified in the latest location change notification.

FIG. 11G illustrates the state of the first endpoint system 1102 and the state of the second endpoint system 1152 once the ball has reached the second avatar. The first endpoint system receives the location change notification 1110 that indicates that the ball is at the second avatar 1106, and, if caught, a grab status notification indicating that the ball is grabbed by the second avatar 1106. Because the motion of the ball 1108 was delayed to compensate for the latency, the ball 1108 and the location specified in the location change notification 1110 match upon arrival.

To generalize the example actions taken by the endpoint systems: if a given endpoint system does not have object authority over an object that is being simulated by a physics engine, the given endpoint system checks to see if the object is likely to interact with another avatar. If the object is going to interact with another avatar, the given endpoint system compensates for the latency such that the presentation of the object by the given endpoint system will be synchronized to the receipt of the location change notification at the time of interaction. If the object is going to interact with the avatar of the given endpoint system, the given endpoint system compensates for the latency such that the presentation of the object will be synchronized to the authoritative location of the object when an authority transfer notification is transmitted by the given endpoint system.

Interaction of an object with avatar is described above because it is a typical interaction that will be determined by something other than physics (e.g., whether a catch is successful or not). In some embodiments, presentation of other nondeterministic behaviors may be compensated for in similar ways.

FIGS. 12A-12G are a flowchart that illustrates a method of processing an interaction with a virtual object within a shared virtual environment according to various aspects of the present disclosure. From a start block, the method 1200 proceeds to block 1202, where an environment presentation engine 604 of a first endpoint system 402 presents the object within the shared virtual environment to a first user using the head-mounted display device (HMDD) 614 of the first endpoint system 402. At block 1204, the first user uses a handheld controller device (HCD) 618 of the first endpoint system 402 to grasp the object within the shared virtual environment. In some embodiments, grasping may involve using the handheld controller device 618 to move a hand of the avatar of the first user close to the object, and then actuating a user input device such as a trigger button on the handheld controller device 618. In some embodiments, techniques for monitoring user hand position to indicate a grasp action other than actuation of a trigger button (such as motion-sensor based hand state monitoring), or other techniques for grasping the object (such as using the handheld controller device 618 to aim a targeting ray at the object before actuating the user input device), may be used.

Next, at procedure block 1206, an object authority engine 606 of the first endpoint system 402 generates a grab status notification and transmits the grab status notification to other endpoint systems via the communication relay server 410. Any suitable technique for transmitting the notifications via the communication relay server 410, including but not limited to the method illustrated in FIG. 9, may be used. In some embodiments, the grab status notification may include at least a unique object identifier of the grabbed object, a unique identifier of the hand object grabbing the object, and/or a unique identifier of the grabbing avatar. In some embodiments, the grab status notification may include a location at which it was grabbed. In some embodiments, generating the grab status notification may also include transmitting an authority transfer notification in order to take object authority for the object as described further below, if the first endpoint system 402 did not already have object authority. In some embodiments, the authority transfer notification may not be generated if the first endpoint system 402 already has object authority.

At block 1208, the other endpoint systems receive the grab status notification, and the corresponding environment presentation engines 604 of the other endpoint systems begin presenting the object as grabbed by a first avatar of the first endpoint system 402. In some embodiments, presenting the object as "grabbed" by the first avatar may change the appearance of the object and/or the hand of the first avatar. For example, instead of presenting separate objects for a hand and a racquet when an object representing a racquet is grabbed, the environment presentation engines 604 may instead show a single combined object that appears to be a hand holding a racquet, or may present just the racquet itself without the hand.

The method 1200 then proceeds through a continuation terminal ("terminal B") to block 1210, where a motion sensor device 616 of the first endpoint system 402 detects motion of the handheld controller device 618. Next, at block 1212, the environment presentation engine 604 of the first endpoint system 402 presents the object within the shared virtual environment based on the detected motion. For example, if the motion sensor device 616 sensed that the handheld controller device 618 moved right three inches, the object would move within shared virtual environment as presented by the environment presentation engine 604 a commensurate amount. To be clear, presenting the object within the shared virtual environment may include using the head-mounted display device 614 of the first endpoint system 402 to show an image of the object to the user. The presentation generated by the environment presentation engine 604 of the first endpoint system 402 is not directly displayed by other endpoint systems.

At procedure block 1214, the object authority engine 606 of the first endpoint system 402 generates a location change notification and transmits the location change notification to other endpoint systems via the communication relay server 410. Any suitable technique for transmitting the notifications via the communication relay server 410, including but not limited to the method illustrated in FIG. 9, may be used. In some embodiments, the location change notification may include information such as an absolute location specified in a coordinate system of the shared virtual environment, a velocity with respect to the coordinate system of the shared virtual environment, a spin, a relative location compared to a previous location, a timestamp, and/or the like.

The method 1200 then proceeds to a continuation terminal ("terminal C"). From terminal C (FIG. 12B), the method 1200 proceeds to block 1216, where the other endpoint systems receive the location change notification. At block 1218, latency compensation engines of the other endpoint systems animate the presented position of the object based on the location change notification. In some embodiments, the environment presentation engine 604 is initially presenting the object in a first location. Animating the presented position of the object based on the location change notification may include using a location from the location change notification and a determined latency between the first endpoint system and the current endpoint system to interpolate a set of positions (or a path) between the first location and the location from the location change notification. The latency compensation engine 608 may then provide the set of positions (or the path) to the environment presentation engine 604 for presentation.

These animation steps may be performed by the latency compensation engine 608 instead of the physics engine 610 because the object is grabbed and its behavior is therefore nondeterministic. In some embodiments, the physics engine 610 may nevertheless be used in the presentation in order to do collision detection, prevent clipping, and/or the like. In some embodiments, the latency compensation engine 608 may be configured to measure the latency by comparing a timestamp in the transmitted notification to a current local time that is synchronized between the endpoint systems via the virtual environment provider system 400. In some embodiments, the latency compensation engine 608 may be configured to measure the latency using ping values between the receiving endpoint system and the communication relay server 410, and between the transmitting endpoint system and the communication relay server 410.

The method 1200 then proceeds to a decision block 1220, where a determination is made regarding whether the object is still grabbed. In some embodiments, the object may be determined to still be grabbed if the user input device (such as a trigger button) used to initiate the grab is still activated, or if a detected hand position used to initiate the grab is still maintained. If the object is still grabbed, then the result of the determination at decision block 1220 is YES, and the method 1200 returns to terminal B for further processing. In some embodiments, the method 1200 may return to terminal B to loop as fast as possible. In some embodiments, the method 1200 may wait to return to terminal B in order to conserve processing power for other tasks. In one example embodiment, the loop between terminal B and decision block 1220 may repeat about 20 times a second. Because this is likely to be slower than the framerate generated by the head-mounted display device (which, in some embodiments, may be 90 hz or higher), interpolation between the reported positions will be helpful to smooth out the movement.

Otherwise, if the object is no longer grabbed, then the result of the determination at decision block 1220 is NO, and the method 1200 proceeds to procedure block 1222. At procedure block 1222, the object authority engine 606 of the first endpoint system 402 transmits a grab canceled notification to other endpoint systems via the communication relay server 410. Any suitable technique for transmitting the notifications via the communication relay server 410, including but not limited to the method illustrated in FIG. 9, may be used. In some embodiments, the grab canceled notification may include the unique object identifier, the identifier of the grabbing hand, and/or the identifier of the grabbing avatar. Though the grab notification may have included or been associated with an authority transfer notification, the grab canceled notification would not itself include or be associated with a notification that releases object authority. Instead, object authority will be taken by another endpoint system when appropriate, as discussed further below. The method 1200 then proceeds to block 1224, where the other endpoint systems receive the grab canceled notification, and the environment presentation engines 604 of the other endpoint systems begin presenting the object as no longer grabbed by the first avatar. In some embodiments, the other endpoint systems may again present the hand of the first avatar and the object as separate objects.

The method 1200 then proceeds to a continuation terminal ("terminal D"), and from terminal D (FIG. 12C) to block 1226, where a physics engine 610 of the first endpoint system 402 simulates behavior of the object within the shared virtual environment. In some embodiments, the physics engine 610 simulates behavior of the object by taking initial conditions provided from other components (such as the initial location and/or velocity), calculate motion and/or behavior of the object by altering the initial conditions using one or more simulated forces over a given time period, and generating a new position based on the motion and/or behavior calculation. In some embodiments, the calculations of simulated forces may include but are not limited to gravity, air resistance, wind, friction, collision detection, rigid body dynamic calculations, soft body dynamic calculations, and fluid dynamics. In some embodiments, the physics engine 610 may also generate an extrapolation of future positions as part of its simulation of behavior. Next, at block 1228, the environment presentation engine 604 of the first endpoint system 402 animates the presented position of the object within the shared virtual environment based on the simulated behavior. In some embodiments, the environment presentation engine 604 may render the object directly at the new position provided by the physics engine 610, if rate of calculation by the physics engine 610 is fast enough to keep up with the framerate generated by the environment presentation engine 604 and the head-mounted display device 614. In some embodiments, the environment presentation engine 604 may render the object at interpolated positions between the new position and the previous position if the physics engine 610 is not fast enough to keep up with the framerate.

At procedure block 1230, the object authority engine 606 of the first endpoint system 402 transmits a location change notification based on the simulated behavior to other endpoint systems via the communication relay server 410. Any suitable technique for transmitting the notifications via the communication relay server 410, including but not limited to the method illustrated in FIG. 9, may be used. In some embodiments, the location change notification may include the location, velocity, and/or any other information generated by the physics engine 610. At block 1232, the other endpoint systems receive the location change notification, and physics engines 610 of the other endpoint systems predict future movement of the object based on the location change notification. In some embodiments, the future movement is predicted in order to determine whether an avatar associated with another endpoint system is predicted to interact with the object (e.g., the future movement shows that the avatar and the object will collide, the future movement shows that the object will be within reach of the avatar to strike it with a grabbed object, the future movement shows that the avatar will be within range to try to catch the object, and so on). If the other endpoint system determines that it is predicted to interact, then object authority will be transferred as described below.

The method 1200 then proceeds to a decision block 1234, where a determination is made regarding whether object authority should be transferred to another endpoint system. If it was determined that the object is predicted to interact with another avatar, then the result of the determination at decision block 1234 is YES, and the method 1200 proceeds to a continuation terminal ("terminal E"). Otherwise, if the object is not predicted to interact with another avatar, then the result of the determination at decision block 1234 is NO, and the method 1200 proceeds to block 1236.

At block 1236, where the object is not predicted to interact with another avatar, latency compensation engines 608 of the other endpoint systems animate the presented position of the object based on the location change notification and the predicted future movement. In some embodiments, the latency compensation engines 608 may also base the animation on a measurement of the latency between the first endpoint system 402 and the presenting endpoint system. This may be done to help the presentation be as close to synchronous as possible on each endpoint system. The animation may include interpolation between location change notifications as well as extrapolate future positions, as described in further detail above.

The method 1200 then proceeds to a decision block 1238, where a determination is made regarding whether the object is still moving. In some embodiments, the predicted future movement may show that object has come to rest. In some embodiments, the determination may find that the location reported in the current location change notification matches the location reported in one or more previous location change notifications. If the determination finds that the object is still moving, then the result of decision block 1238 is YES, and the method 1200 returns to terminal D. Otherwise, if the determination finds that the object is not still moving, then the result of decision block 1238 is NO, and the method 1200 proceeds to an end block and terminates. In some embodiments, part of terminating the method 1200 may be that location change notifications are no longer transmitted by the first endpoint system 402. In some embodiments, part of terminating the method 1200 may be that the first endpoint system 402 transmits the last location a predetermined number of times before ceasing transmissions.

If the method 1200 had determined that another avatar was predicted to interact with the object, then the method 1200 would have advanced from decision block 1234 to terminal E. From terminal E (FIG. 12D), the method 1200 proceeds to block 1240, where a second object authority engine 606 of a second endpoint system 404 determines that the object is predicted to interact with a second avatar associated with the second endpoint system 404 based on the predicted future movement. This determination may have already happened in decision block 1234, but the description is repeated here for clarity (instead of to indicate that the determination occurs twice). At block 1242, a second latency compensation engine 608 of the second endpoint system 404 determines a midpoint between a current location of the object within the shared virtual environment and a current location of the second avatar within the shared virtual environment. In some embodiments, the midpoint may be along the predicted path of travel from the current location of the object to the current location of the second avatar. In some embodiments, the midpoint may be a plane. In some embodiments, the point or plane chosen as the midpoint may actually be closer to the currently location of the object or closer to the current location of the second avatar than the actual midpoint of the distance. For example, in some embodiments, the point chosen may be as close to the current location of the object as possible while still being able to compensate for the latency as described in detail below.

Next, at block 1244, the second latency compensation engine 608 animates the presented position of the object in the shared virtual environment based on the location change notification, the predicted future movement, and the midpoint. As discussed above, in some embodiments the goal of this animation will be to smoothly animate the object traveling from its current location, through the predicted future movement, to the midpoint, at a velocity such that it will "catch up" to the latency-adjusted position at the midpoint. Accordingly, at this point in the method 1200, the animation provided by the second latency compensation engine 608 causes the object to move from a previously presented position to a next presented position as appropriate based on the velocity determined by the second latency compensation engine and the time since the previously animated location.

The method 1200 then proceeds to a continuation terminal ("terminal F"), and from terminal F (FIG. 12E) to a decision block 1246, where a determination is made regarding whether the object has yet reached the midpoint. This determination may be made by the object authority engine 606 of the second endpoint system 404, by the object authority engine 606 of the first endpoint system 402, or both. Thanks to the latency compensation, both endpoint systems should come to same determination at same time. If the determination finds that the object has reached the midpoint, then the result of decision block 1246 is YES, and the method 1200 proceeds to a continuation terminal ("terminal G"). Otherwise, if the object has not yet reached the midpoint, then the result of decision block 1246 is NO, and the method 1200 proceeds to block 1248.

At block 1248, the physics engine 610 of the first endpoint system 402 simulates further behavior of the object within the shared virtual environment, as discussed above. At block 1250, the environment presentation engine 604 of the first endpoint system 402 animates the object within the shared virtual environment based on the simulated further behavior. Next, at procedure block 1252, the object authority engine 606 of the first endpoint system 402 transmits a subsequent location change notification based on the simulated further behavior via the communication relay server 410. Any suitable technique for transmitting the notifications via the communication relay server 410, including but not limited to the method illustrated in FIG. 9, may be used.

At block 1254, the second endpoint system 404 receives the subsequent location change notification. Then, at block 1256, the second latency compensation engine 608 animates the presented position of the object based on the subsequent location change notification and the midpoint. As with the previous animation by the second latency compensation engine 608, this animation may also be based on the measured latency. In some embodiments, if the motion of the object is deterministic when the same initial conditions are processed by different physics engines 610, then the second latency compensation engine 608 may simply update predicted motion based on the new location change notification to confirm synchronization. If the new location specified in the new location change notification does not match the location predicted by the second latency compensation engine 608 and/or the second physics engine 610, then the second endpoint system 404 may recalculate the future predicted motion based on the new location change notification. The method 1200 then returns to terminal F.

If the object had reached the midpoint, then from decision block 1246 the method 1200 advanced to terminal G. From terminal G (FIG. 12F), the method 1200 proceeds to procedure block 1258, where the second object authority engine 606 generates an authority transfer notification and transmits the authority transfer notification to other endpoint systems via the communication relay server 410. Any suitable technique for transmitting the notifications via the communication relay server 410, including but not limited to the method illustrated in FIG. 9, may be used. In some embodiments, the authority transfer notification may include an identifier of the second avatar and the unique identifier of the object. In some embodiments, the authority transfer notification may also include the current location information as authoritatively determined by second endpoint system 404.

At block 1260, the first endpoint system 402 receives the authority transfer notification and ceases transmission of the location change notifications for the object. In some embodiments, the physics engine 610 of first endpoint system 402 may continue to simulate motion of the object and the environment presentation engine 604 of the first endpoint system 402 may continue to present the motion generated by the physics engine, but since this motion is no longer authoritative, the object authority engine 606 of the first endpoint system 402 no longer generates location change notifications based on the motion, and the motion is subject to being altered by future location change notifications as described below. In some embodiments, the object authority engine 606 of the first endpoint system 402 may transmit a transfer acknowledgement notification to other endpoint systems in order to notify the other endpoint systems that they should acknowledge the transfer of authority and begin using the location change notifications from the second endpoint system 404. In some embodiments, the other endpoint systems may have determined on their own that the second endpoint system 404 should be claiming object authority based on their own simulated models of the shared virtual environment, and acknowledge the transfer of authority based on that determination. In some embodiments, other endpoint systems will recognize the transfer of authority simply from the fact that they are no longer receiving location change notifications from the first endpoint system 402 but are receiving location change notifications from the second endpoint system 404.

From block 1260, the method 1200 proceeds through a continuation terminal ("terminal H") to block 1262, where a physics engine 610 of the second endpoint system 404 simulates behavior of the object within the shared virtual environment. At block 1264, the environment presentation engine 604 of the second endpoint system 404 animates the object within the shared virtual environment based on the simulated behavior. As with the discussion in block 1212, presenting the object within the shared virtual environment may include using the head-mounted display device 614 of the second endpoint system 404 to show an image of the object to the user. The presentation generated by the environment presentation engine 604 of the second endpoint system 404 is not directly displayed by other endpoint systems. Because the second endpoint system 404 now has object authority, this presentation matches the output of the physics engine 610 of the second endpoint system 404, and so can appear very natural and immersive to the user of the second endpoint system 404.

At procedure block 1266, the second object authority engine 606 transmits a location change notification based on the simulated behavior to other endpoint systems via the communication relay server 410. Any suitable technique for transmitting the notifications via the communication relay server 410, including but not limited to the method illustrated in FIG. 9, may be used. At block 1268, the other endpoint systems receive the location change notification, and physics engines 610 of the other endpoint systems predict future movement of the object. At block 1270, latency compensation engines 608 of the other endpoint systems animate the presented position of the object based on the location change notification and the predicted future movement.

For the third endpoint system 406, the compensation in the animation based on the location change notification from the second endpoint system 404 and the predicted future movement will be similar to what it was doing when it was receiving the location change notifications from the first endpoint system 402, but with a new measurement of latency. For the first endpoint system 402, however, it will be slightly different. Instead of speeding the object up to catch up to the predicted location, the object will be slowing down to allow the locations from the location change notification to overcome the latency and catch up to the presented location. In both cases, the presented location of the object is being urged towards the location specified in the location change notification. Assuming the latency values are similar, from the point of view of the third endpoint system 406, the speed of the object would appear roughly constant. From the point of view of the first endpoint system 402, the speed of the object would appear normal, and then would slow down as it approached the second avatar. Form the point of view of the second endpoint system 404, the object would at first be travelling fast, would slow down as it approached the midpoint, and then appear to travel the rest of the way normally.

In some embodiments, the latency compensation engine 608 of the first endpoint system 402 may determine a predicted time of the collision between the object and the second avatar, and may use the predicted collision time as a basis for its latency compensation. In other words, if the latency is measured as a tenth of a second, then the latency compensation engine 608 of the first endpoint system 402 will slow the travel of the object such that the predicted time of collision in the presentation on the first endpoint system 402 is a tenth of a second late. This way, the behavior of the object after the collision can be determined by the received location change notifications, and will not have to undo incorrect predicted future movement after the location change notifications are received.

The method 1200 then proceeds to a continuation terminal ("terminal J"). From terminal J (FIG. 12G), the method 1200 proceeds to a decision block 1272, where a determination is made regarding whether the object is being grabbed by the second avatar. As described above, the object may be grabbed by the second avatar if the hand of the second avatar is close to the object, and input representing a grab is detected by the handheld controller device 618. The authoritative determination of whether the grab is occurring may be made by the physics engine 610 of the second endpoint system 404. If the object is not being grabbed, it may not yet be in range of the second avatar, it may have missed the second avatar, and so on. As such, its motion would still be defined by the physics engine 610 of the second endpoint system 404. If the object is being grabbed by the second avatar, then the second endpoint system 404 will transition from using the physics engine 610 to using the detected motion to generate the locations for the location change notifications.

Accordingly, if the determination finds that the object is being grabbed by the second avatar, then the result of decision block 1272 is YES, and the method 1200 proceeds to procedure block 1274, where the second object authority engine 606 generates a grab status notification and transmits the grab status notification to other endpoint systems via the communication relay server 410. Any suitable technique for transmitting the notifications via the communication relay server 410, including but not limited to the method illustrated in FIG. 9, may be used. At block 1276, the other endpoint systems receive the grab status notification, and the corresponding environment presentation engines 604 begin presenting the object as grabbed by the second avatar. Next, at block 1278, a motion sensor device 616 of the second endpoint system 404 detects motion of a handheld controller device 618 of the second endpoint system 404 used to grab the object. At block 1280, the environment presentation engine 604 of the second endpoint system 404 presents the object within the shared virtual environment based on the detected motion. Next, at procedure block 1282, the second object authority engine 606 generates a location change notification and transmits the location change notification to other endpoint systems via the communication relay server 410. Again, any suitable technique for transmitting the notifications via the communication relay server 410, including but not limited to the method illustrated in FIG. 9, may be used. The method 1200 then proceeds to block 1284, where other endpoint systems receive the location change notification, and the corresponding latency compensation engines 608 animate the presented position of the object based on the location change notification.

One will recognize that the set of blocks 1274-1284 are similar to the set of blocks 1206-1218, but describe actions after the second avatar has grabbed the object that was released by the first avatar. In the interest of brevity, the additional details described above with respect to blocks 1206-1218 are not repeated with respect to blocks 1274-1284, but those details apply equally to the actions described in blocks 1274-1284.

From block 1284, the method 1200 proceeds to an end block and terminates. One of ordinary skill in the art will recognize that, as an ongoing control technique, the method 1200 may not actually terminate after block 1284 but may instead loop back to a previous state. For example, in some embodiments, the method 1200 would not terminate, but would instead loop back to, for example, block 1278 to present continued grabbed motion of the object. In some embodiments, method 1200 would, instead of terminating, detect that the object is no longer grabbed, and then perform processing similar to that described in the NO branch of decision block 1220.

Returning to decision block 1272, if the determination finds that the object is not being grabbed by the second avatar, then the result of decision block 1272 is NO, and the method 1200 proceeds to another decision block 1286, where a determination is made regarding whether the object is still moving. The determination may be made by the physics engine 610 of the second endpoint system 404. The object may no longer be moving if, for example, the object was not caught and instead bounced off of the second avatar, or the object missed the second avatar and continued on its previous path, and eventually came to rest. If the determination finds that the object is still moving, then the result of decision block 1286 is YES, and the method 1200 returns to terminal H for further physical modeling of the motion of the object by the second endpoint system 404. Otherwise, if the determination finds that the object is not moving any longer, then the result of decision block 1286 is NO, and the method 1200 proceeds to an end block and terminates. In this case, terminating will cause the second endpoint system 404 to cease sending location change notifications for the object, as discussed above in the NO branch of decision block 1238.

One of skill in the art will recognize that, in the description above, like names refer to like elements, even if numbering is different. For example, the first endpoint system 302, the second endpoint system 304, and the third endpoint system 306 illustrated in FIGS. 3A and 3B are all examples of an endpoint system 600 as illustrated in FIG. 6. Likewise, the endpoint systems in FIG. 4 are also examples of an endpoint system 600.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for managing object authority within a shared virtual environment, the system comprising:
   a first endpoint system; and
   a second endpoint system;
   wherein the first endpoint system is configured to:
      simulate motion of an object within the shared virtual environment, wherein the first endpoint system initially has object authority over the object; and
      transmit at least one location change notification based on the simulated motion; and
   wherein the second endpoint system is configured to:
      receive the at least one location change notification;
      predict future movement of the object based on the at least one location change notification;
      present the object in the shared virtual environment based on the at least one location change notification and the predicted future movement; and
      in response to determining that the object is predicted to interact with an avatar associated with the second endpoint system and detecting that the object has reached a midpoint in travel between an avatar associated with the first endpoint system and the avatar associated with the second endpoint system:
    transmit an authority transfer notification to other endpoint systems to assign object authority for the object to the second endpoint system.

2. The system of claim 1, wherein presenting the object in the shared virtual environment based on the at least one location change notification and the predicted future movement includes:
    present the object in the shared virtual environment in an initial location; and
    in response to receiving the at least one location change notification and before transmitting the authority transfer notification:
        present the object in the shared virtual environment in a new location based on the location change notification;
    wherein presenting the object in the new location includes animating the presented location of the object as traveling from the initial location to a location based on the at least one location change notification; and
    wherein animating the presented location includes using interpolation to generate presentation locations between the initial location and the location based on the at least one location change notification.

3. The system of claim 2, wherein the second endpoint system is further configured to determine an amount of latency between the transmission of the at least one location change notification by the first endpoint system and the receipt of the at least one location change notification by the second endpoint system, and wherein the new location based on the at least one location change notification is extrapolated from a location specified by the location change notification using the determined amount of latency.

4. The system of claim 1, wherein the first endpoint system is further configured to:
    present the object in the shared virtual environment in an initial location; and
    after receiving the authority transfer notification and a location change notification from the second endpoint system:
        present the object in the shared virtual environment in a new location based on the location change notification;
    wherein presenting the object in the new location includes animating the presented location of the object as traveling from the initial location to a location based on the at least one location change notification; and
    wherein animating the presented location includes using interpolation to generate presentation locations between the initial location and the location based on the at least one location change notification.

5. The system of claim 4, wherein the first endpoint system is further configured to determine an amount of latency between the transmission of the at least one location change notification by the second endpoint system and the receipt of the location change notification by the first endpoint system, and wherein the location based on the location change notification is extrapolated from a location specified by the location change notification using the determined amount of latency.

6. The system of claim 1, wherein the at least one location change notification includes at least one of a position within the shared virtual environment and a velocity with respect to the shared virtual environment.

7. The system of claim 1, wherein at least one of the first endpoint system and the second endpoint system comprises:
    an endpoint computing device;
    a head-mounted display device communicatively coupled to the endpoint computing device; and
    at least one handheld controller device communicatively coupled to the endpoint computing device.

8. The system of claim 1, wherein the first endpoint system is further configured to stop sending location change notifications in response to receiving the authority transfer notification.

9. The system of claim 1, further comprising a communication relay server, wherein transmitting at least one location change notification comprises sending at least one location change notification to the communication relay server, and wherein the communication relay server is configured to:
    receive the at least one location change notification from the first endpoint system;
    determine a plurality of other endpoint systems to receive the at least one location change notification; and
    transmit the at least one location change notification to the plurality of other endpoint systems.

10. The system of claim 9, wherein the communication relay server is configured to save at least a portion of the at least one location change notification in a state data store.

11. A method for managing object authority within a shared virtual environment, the method comprising:
    presenting, by the first endpoint system, the object in the shared virtual environment in an initial location;
    simulating, by a first endpoint system, motion of an object within the shared virtual environment, wherein the first endpoint system initially has object authority over the object;
    transmitting, by the first endpoint system, location change notifications for the object based on the simulated motion;
    receiving, by the first endpoint system, an authority transfer notification generated by a second endpoint system indicating that the second endpoint system has taken object authority over the object in response to detecting that the object has reached a midpoint in travel between an avatar associated with the first endpoint system and an avatar associated with the second endpoint system;
    ceasing, by the first endpoint system, to transmit location change notifications for the object;
    receiving, by the first endpoint system, a location change notification transmitted from the second endpoint system; and
    presenting, by the first endpoint system, the object in the shared virtual environment in a new location based on the location change notification.

12. The method of claim 11,
    wherein presenting the object in the new location includes animating the presented location of the object as traveling from the initial location to a location based on the location change notification; and
    wherein animating the presented location includes using interpolation to generate presentation locations between the initial location and the location based on the location change notification.

13. The method of claim 11, further comprising determining, by the first endpoint system, an amount of latency between the transmission of the location change notification by the second endpoint system and the receipt of the location change notification by the first endpoint system, and wherein the new location based on the location change notification is extrapolated from a location specified by the location change notification using the determined amount of latency.

14. The method of claim 13, wherein the extrapolation causes the object to appear to a user of the first endpoint system to travel slower.

15. A method for managing object authority for an object within a shared virtual environment, the method comprising:
   receiving, by a second endpoint system, at least one location change notification from a first endpoint system;
   predicting, by the second endpoint system, future movement of the object based on the at least one location change notification;
   presenting, by the second endpoint system, the object in the shared virtual environment based on the at least one location change notification and the predicted future movement; and
   in response to determining, by the second endpoint system, that the object is predicted to interact with an avatar associated with the second endpoint system:
      transmitting, by the second endpoint system, an authority transfer notification to other endpoint systems to assign object authority for the object to the second endpoint system in response to detecting that the object has reached a midpoint in travel between an avatar associated with the first endpoint system and the avatar associated with the second endpoint system.

16. The method of claim 15, wherein presenting the object in the shared virtual environment based on the at least one location change notification and the predicted future movement includes:
   presenting, by the second endpoint system, the object in the shared virtual environment in an initial location; and;
   in response to receiving the at least one location change notification and before transmitting the authority transfer notification:
      presenting, by the second endpoint system, the object in the shared virtual environment in a new location based on the at least one location change notification;
   wherein presenting the object in the new location includes animating the presented location of the object as traveling from the initial location to a location based on the at least one location change notification; and
   wherein animating the presented location includes using interpolation to generate presentation locations between the initial location and the location based on the at least one location change notification.

17. The method of claim 16, further comprising determining an amount of latency between the transmission of the at least one location change notification by the first endpoint system and the receipt of the at least one location change notification by the second endpoint system, and wherein the location based on the at least one location change notification is extrapolated from a location specified by the at least one location change notification using the determined amount of latency.

18. The method of claim 17, wherein the extrapolation causes the object to appear to a user of the second endpoint system to travel faster.

* * * * *